US011791756B2

United States Patent
Xu et al.

(10) Patent No.: US 11,791,756 B2
(45) Date of Patent: Oct. 17, 2023

(54) POWER TOOL

(71) Applicant: Nanjing Chervon Industry Co., Ltd., Nanjing (CN)

(72) Inventors: Yanqing Xu, Nanjing (CN); Dezhong Yang, Nanjing (CN); Hongwei Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 98 days.

(21) Appl. No.: 17/479,473

(22) Filed: Sep. 20, 2021

(65) Prior Publication Data

US 2022/0006406 A1 Jan. 6, 2022

Related U.S. Application Data

(63) Continuation of application No. PCT/CN2019/128577, filed on Dec. 26, 2019.

(30) Foreign Application Priority Data

Mar. 28, 2019 (CN) .......................... 201910243626.8
Jul. 31, 2019 (CN) .......................... 201910700467.X

(51) Int. Cl.
*H02P 21/22* (2016.01)
*B23B 45/02* (2006.01)
(Continued)

(52) U.S. Cl.
CPC .............. *H02P 21/22* (2016.02); *B23B 45/02* (2013.01); *B25F 5/00* (2013.01); *H02P 27/12* (2013.01);
(Continued)

(58) Field of Classification Search
CPC ...... H02P 21/22; H02P 27/12; H02P 2205/07; H02P 2207/05; H02P 21/141;
(Continued)

(56) References Cited

U.S. PATENT DOCUMENTS 6,288,514 B1 * 9/2001 Direnzo ................ H02P 25/089
  318/715
6,472,842 B1 * 10/2002 Ehsani ................ H02P 25/0925
  318/798

(Continued)

FOREIGN PATENT DOCUMENTS

| CN | 1965470 A | 5/2007 |
|---|---|---|
| CN | 102335895 A | 2/2012 |
| CN | 108430710 A | 8/2018 |

OTHER PUBLICATIONS

EPO, extended European search report issued on European publication No. 3932617, dated Apr. 4, 2022, 7 pages.

(Continued)

*Primary Examiner* — David Luo

(74) *Attorney, Agent, or Firm* — Greenberg Traurig, LLP

(57) ABSTRACT

A power tool includes a motor, a power supply device, a driver circuit, a parameter acquisition module, and a controller. The motor includes a stator and a rotor. The motor is configured to generate a reluctance torque. The driver circuit is electrically connected to the motor to drive the motor. The parameter acquisition module is configured to acquire a current of the motor, a rotational speed of the motor, and a position of the rotor. The controller is configured to: according to at least one of the current of the motor, the rotational speed of the motor, or the position of the rotor, dynamically adjust a current applied to the stator so that an included angle between a stator flux linkage of the motor and a rotor flux linkage of the motor ranges from 90° to 135°.

20 Claims, 14 Drawing Sheets

(51) Int. Cl.
 *B25F 5/00* (2006.01)
 *H02P 27/12* (2006.01)
(52) U.S. Cl.
 CPC ...... *H02P 2205/07* (2013.01); *H02P 2207/05* (2013.01)
(58) Field of Classification Search
 CPC .......... H02P 21/50; H02P 25/08; B23B 45/02; B25F 5/00; Y02P 70/10; B25B 23/147
 USPC ...................................... 318/17, 3
 See application file for complete search history.

(56) References Cited

U.S. PATENT DOCUMENTS

| | | | |
|---|---|---|---|
| 7,095,205 B2* | 8/2006 | Ehsani | H02P 6/18 318/254.1 |
| 2007/0267990 A1 | 11/2007 | Abolhassani et al. | |
| 2008/0297080 A1 | 12/2008 | Bosch | |
| 2014/0013564 A1 | 1/2014 | Klotblixt | |
| 2014/0338948 A1 | 11/2014 | Hester et al. | |
| 2015/0115857 A1 | 4/2015 | Sergyeyenko et al. | |
| 2018/0076745 A1 | 3/2018 | Cox | |
| 2018/0323665 A1 | 11/2018 | Chen | |

OTHER PUBLICATIONS

ISA/CN, Int. Search Report issued on PCT application No. PCT/CN2019/128577, dated Mar. 27, 2020, 4 pages.

ISA/CN, English translation of Int Search Report issued on PCT application No. PCT/CN2019/128577, dated Mar. 27, 2020, 2 pages.

Office Action from EP application No. 19920695.4, dated Apr. 28, 2023, 8 pp.

* cited by examiner

US 11,791,756 B2

POWER TOOL

RELATED APPLICATION INFORMATION

This application is a continuation of International Application Number PCT/CN2019/128577, filed on Dec. 26, 2019, through which this application also claims the benefit under 35 U.S.C. § 119(a) of Chinese Patent Application No. CN 201910243626.8, filed on Mar. 28, 2019, and Chinese Patent Application No. CN 201910700467.X, filed on Jul. 31, 2019, which are incorporated by reference in their entirety herein.

BACKGROUND

A power tool in the related art generally uses a square wave to drive a motor in the power tool, and a duty cycle of a square wave signal is adjusted to control a speed of the motor and a torque.

For a brushless direct current motor, in a square wave control mode in the related art, a driver circuit has a plurality of driving states in order to make the brushless motor rotate. Under a driving state, a stator winding of the brushless motor can generate a magnetic field. A controller is configured to output a corresponding drive signal to the driver circuit according to a rotational position of a rotor so as to make the driver circuit switch the driving state. Therefore, a state of a voltage applied to the winding of the brushless motor is changed, and an alternating magnetic field is generated to drive the rotor to rotate, so that the brushless motor is driven.

For the brushless motor, in a square wave modulation control mode in the related art, in an electrical cycle, the brushless motor has only six states, or a stator current has six states (that is, a three-phase bridge arm has six switching states). Each current state can be regarded as a synthesized torque which is a vector in one direction, and six vectors are converted regularly and step by step, so that the rotor is driven to rotate, and the rotor of the motor rotates synchronously.

Square wave control in the related art is easy to achieve, but since the square wave control has only six discrete and discontinuous vector torques, the efficiency of the motor and the efficiency of a whole machine are low, and in the case of heavy load, the locked rotor may appear frequently.

Further, in the related art, the speed of the motor is difficult to be further improved in the square wave control mode after reaching a certain speed, and in the case of light load, the speed is usually desired to be as high as possible. For this reason, a common method is to use a mechanical structure. Different gear ratios are configured to achieve speed regulation, but the mechanical structure must be used. Moreover, a speed regulation range is greatly limited by the motor. The mechanical gear structure can also increase a weight of the whole machine, affecting the use.

SUMMARY

The present application provides a power tool. The power tool includes a motor, a power supply device, a driver circuit, and a controller. The motor includes a stator and a rotor, and the motor is configured to generate a reluctance torque. The power supply device is configured to supply electrical energy to the motor. The driver circuit is electrically connected to the motor to drive the motor. The controller is configured to control the driver circuit. The controller is configured to: according to at least one of a current of the motor, a rotational speed of the motor, or a position of the rotor, dynamically adjust a current applied to the stator so that an included angle between a stator flux linkage of the motor and a rotor flux linkage of the motor range from 90° to 135°.

The present application further provides another power tool. The power tool includes a motor, a power supply device, a driver circuit, and a controller. The motor includes a stator and a rotor, and the motor is a motor capable of generating a reluctance torque. The power supply device is configured to supply electrical energy to the motor. The driver circuit is electrically connected to the motor to drive the motor. The controller is configured to control the driver circuit. The controller is configured to perform following operation: in a first load interval, controlling the driver circuit in a first characteristic control mode so as to make the motor rotate within a range of a first rotational speed; and in a second load interval, controlling the driver circuit in a second characteristic control mode so as to make the motor rotate within a range of a second rotational speed. The first characteristic control mode includes: according to at least one of a current of the motor, a rotational speed of the motor, or a position of the rotor of the motor, dynamically adjusting a current applied to the stator so that an included angle between a stator flux linkage and a rotor flux linkage ranges from 135° to 180°. The second characteristic control mode includes: according to the at least one of the current of the motor, the rotational speed of the motor, or the position of the rotor of the motor, dynamically adjusting the current applied to the stator so that the included angle between the stator flux linkage and the rotor flux linkage ranges from 90° to 135°.

DETAILED DESCRIPTION

The present application will be described below in detail in conjunction with drawings and examples.

A power tool of the present application may be a hand-held power tool, a garden tool, or a garden vehicle such as a vehicle-type lawn mower, which is not limited herein. The power tool of the present application may include a power tool requiring speed regulation, such as a screwdriver, a drill, a wrench, and an angle grinder; a power tool such as a sanding machine, which may be used to grind workpieces; a reciprocating saw, a circular saw, a curve saw, and the like, which may be used to cut workpieces; and an electric hammer and other power tools which may be used for impact. These tools may also be garden tools, such as a pruning machine, a chainsaw, or a vehicle-type lawn mower, and these tools may also be used for other purposes, such as a blender.

Figure 1:
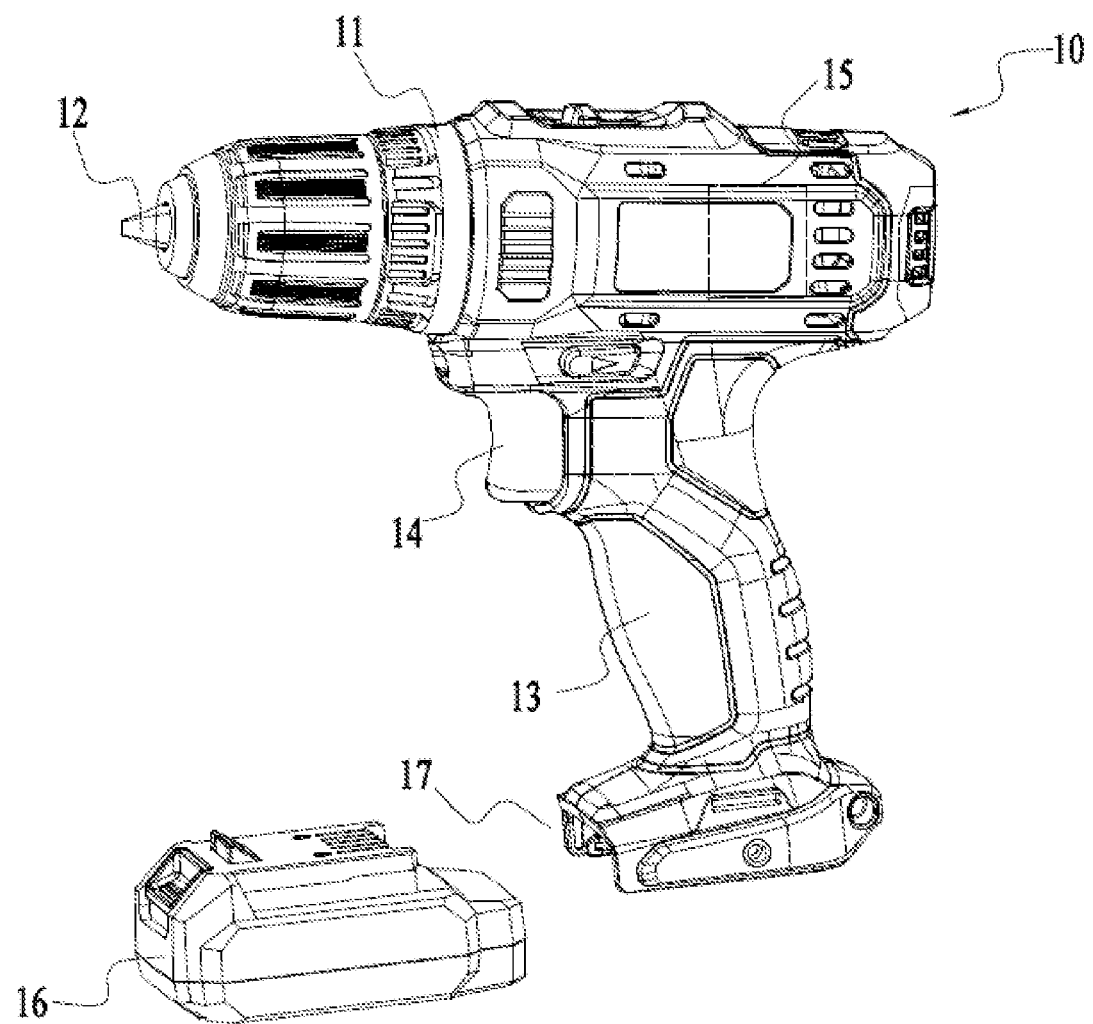
FIG. 1 is an appearance structure view of a drill.

Referring to FIG. 1, a power tool 10 is shown by way of example. The power tool 10 is a drill. The power tool 10 mainly includes a housing 11, a functional part 12, a grip 13, a speed regulation mechanism 14, a motor 15, and a power supply device 16. In some examples, the drill further includes a transmission mechanism, a drill bit, a circuit board, and the like.

The housing 11 is formed with the grip 13, and the grip 13 is for users to hold. In some examples, the grip 13 can be configured as a separate component. The housing 11 constitutes a main body portion of the power tool 10 for accommodating the motor 15, the transmission mechanism, and other electronic components such as the circuit board. A front end of the housing 11 is configured for mounting the functional part.

The functional part 12 is configured to achieve a function of the power tool 10, and the functional part 12 is driven by the motor 15. For different power tools, functional elements are different. For a drill, the functional part 12 is the drill bit and is configured to achieve a drilling function. The drill bit is operatively connected to the motor 15. In some examples, the drill bit is electrically connected to the motor 15 through an output shaft and the transmission mechanism.

The power supply device 16 is configured to supply electrical energy for the power tool 10. In this example, the power tool 10 is the drill, and a battery pack is adopted to supply power for the power tool 10. Optionally, the power tool 10 further includes a battery pack junction 17 configured to connect the battery pack to the drill.

The speed regulation mechanism 14 is configured to set a target rotational speed of the motor 15, that is, the speed regulation mechanism 14 is configured to achieve the speed regulation of the motor 15. The speed regulation mechanism 14 may be a trigger, a knob, or the like. In this example, the speed regulation mechanism 14 is configured as a trigger structure. In other examples, the power supply device 16 may also be an alternating current power supply. In some other examples, the alternating current power supply is configured to supply power for the power tool 10. The alternating current power supply may be a 120V or 220V utility power. The power supply device 16 includes a power conversion unit. The power conversion unit is connected to the alternating current and is configured to convert the alternating current into the electrical energy available for the use of the power tool 10.

In another example of the present application, the handheld power tool includes the motor, a motor drive shaft or output shaft, a tool attachment shaft, and a transmission device. The motor includes a stator and a rotor. The motor drive shaft or output shaft is driven by the rotor of the motor. The tool attachment shaft is configured to support a tool attachment. The transmission device is configured to connect the motor output shaft to the tool attachment shaft so that the torque output by the motor is transferred to the tool attachment. The motor output shaft may be set coaxial, substantially parallel, substantially perpendicular, or inclined with the tool attachment shaft.

In one more example of the present application, the power tool is the garden tool, such as the vehicle-type lawn mower. The vehicle-type lawn 43 includes a main body, at least one drive wheel or drive wheel set, a drive device and a circuit system. The at least one drive wheel or drive wheel set is supported by the main body. The drive device, such as the motor, provides the torque to the at least one drive wheel or drive wheel set. The circuit system controls motor drive operation, which will be described below.

Figure 2:
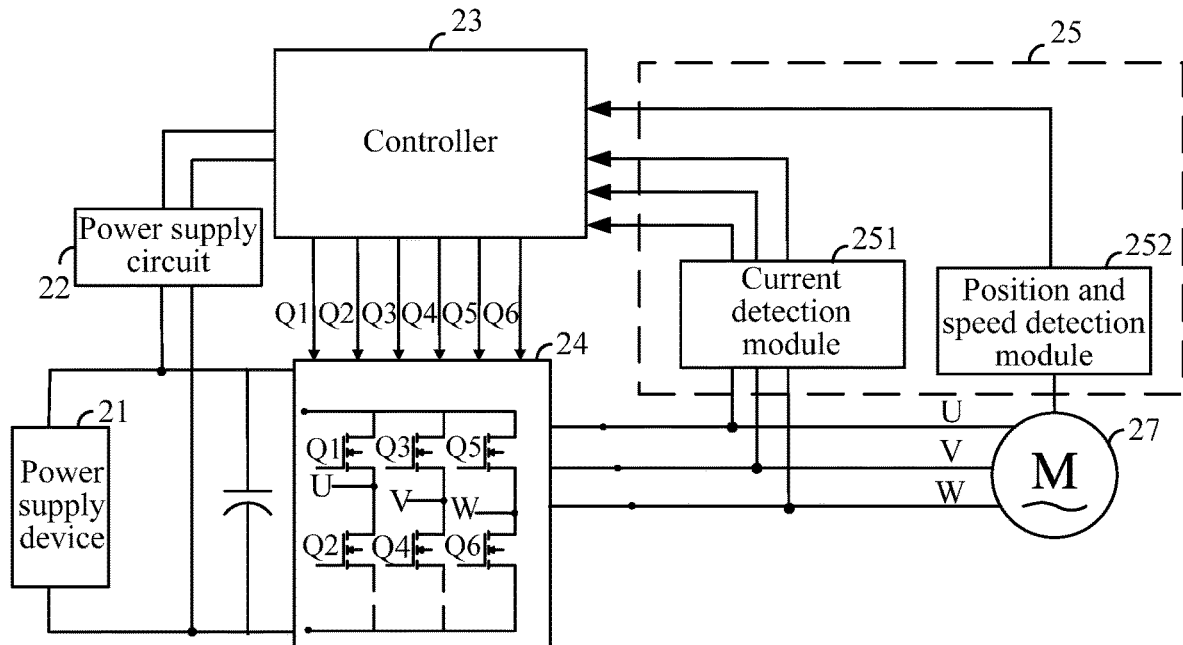
FIG. 2 is a block diagram of a circuit system of a drill according to an example.

Referring to a circuit system 20 of an example of the power tool 10 shown in FIG. 2, the circuit system 20 includes a power supply device 21, a power supply circuit 22, a controller 23, a driver circuit 24, a parameter acquisition module 25, and a motor 27.

The power supply device 21 is configured to supply power for the power tool 10. In some examples, the power supply device 21 outputs a direct current, and in some examples, the power supply device 21 includes the battery pack. In some other examples, the power supply device 21 outputs the alternating current. The alternating current power supply may be a 120V or 220V utility power. An alternating current signal output from the alternating current power supply is rectified, filtered, subjected to voltage division and voltage step-down by the alternating current through a hardware circuit and is converted into the electrical energy available for the use of the power tool. Optionally, the battery pack is used to supply power for the power tool 10, and the power supply device 21 includes the battery pack.

The power supply circuit 22 is electrically connected to the power supply device 21 and is configured to convert the electrical energy from the power supply device 21 into the electrical energy suitable for the use of the power tool. Moreover, the power supply circuit 22 is electrically connected to the controller 23 and can supply power to the controller 23 at least.

In an optional example of the present application, the parameter acquisition module 25 is configured to acquire at least one of a current of the motor 27, a rotational speed of the motor 27, or a position of the rotor. In the example of FIG. 2, the parameter acquisition module 25 includes a current detection module 251 and a position and speed detection module 252. The current detection module 251 is configured to detect the current of the motor. The current includes a phase current. The current detection module 251 may also be configured to detect a bus current of the motor 27. The speed and position detection module 252 includes a sensor. The sensor is connected in association with the motor 27 to directly detect a speed and a position of the motor 27. The speed and position detection module 252 is, for example, a Hall sensor.

Figure 3:
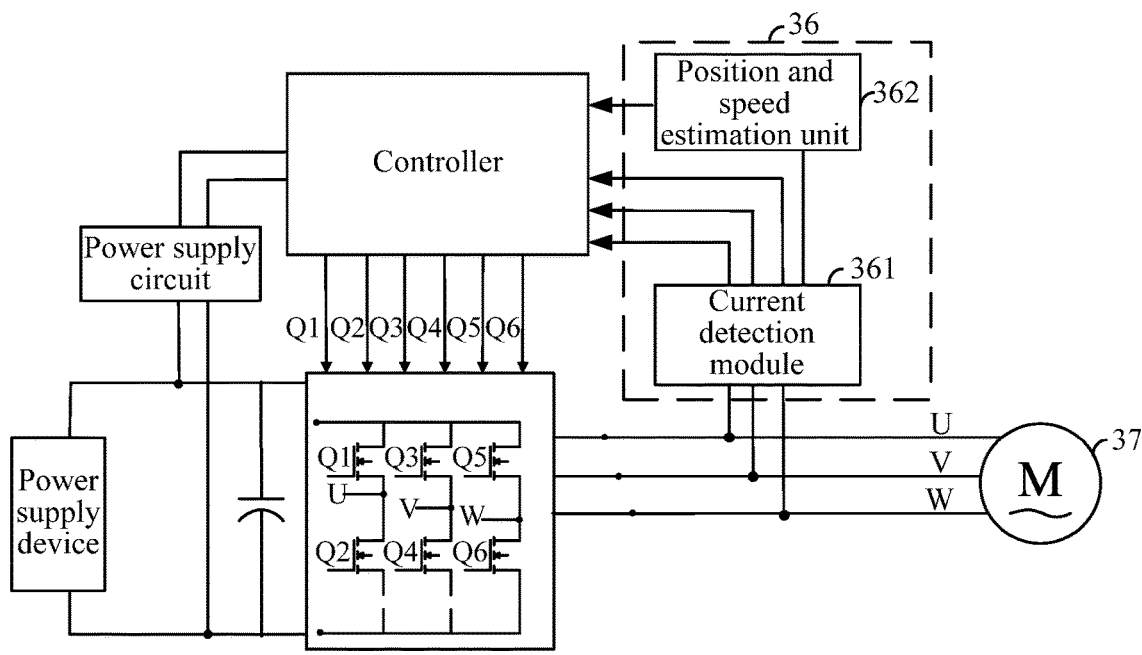
FIG. 3 is a block diagram of a circuit system of a drill according to another example.

In the example of FIG. 2, the speed and position detection module 252 directly detects the speed and the position of the motor 27. In another example, referring to FIG. 3, a position and speed estimation module 362 is adopted by a parameter detection module 36. The rotational speed of the motor 37 and the position of the rotor of the motor 37 are estimated through the detected current of the motor 37, such as by using a state observer detection method.

In some other examples of the present application, the parameter acquisition module 25 is configured to acquire the current of the motor and the rotational speed of the motor. The position of the rotor of the motor may be obtained through analyzing and estimating at least one of the current or the voltage of the motor or may be obtained through parametric characteristics of other elements associated with the motor. In some examples of the present application, the parameter acquisition module 25 may acquire merely the current of the motor, and the rotational speed of the motor may be obtained indirectly through the at least one of the current or the voltage of the motor. The position of the rotor of the motor may be obtained through analyzing and estimating the at least one of the current or the voltage of the motor or may be obtained through the parametric characteristics of other elements associated with the motor. That is, the parameter detection module 25 acquires the at least one of the current of the motor 27, the rotational speed of the motor 27, or the position of the rotor, and other parameters can be obtained through calculating or estimating the parameters obtained.

The controller 23 is electrically connected to the driver circuit 24 and used to control the working of the driver circuit 24. In some examples, a dedicated control chip such as a microcontroller unit (MCU) is adopted by the controller 23.

The driver circuit 24 is electrically connected to the controller 23 and the motor 27, and the driver circuit 24 can drive, according to a control signal of the controller 23, the motor 27 to operate. For a three-phase motor, the driver circuit 24 may be electrically connected to a three-phase winding of the motor 27. The driver circuit 24 may include a switching circuit. The switching circuit is configured to drive the operation of the rotor of the motor 27 according to the control signal of the controller 23. Of course, the number of phases of the motor 27 may be another number.

In order to make the motor 27 rotate, the driver circuit 24 has a plurality of driving states. Under a driving state, a stator winding of the motor 27 can generate a magnetic field. The controller 23 is configured to output a corresponding drive signal to the driver circuit 24 according to a rotational position of the rotor of the motor 27 so as to make the driver circuit 24 switch the driving state. Therefore, the state of at least one of the parameters of a voltage and a current applied to a winding of the motor 27 is changed, and an alternating magnetic field is generated to drive the rotor to rotate, so that the operation of the motor 27 is achieved.

FIG. 2 shows an exemplary driver circuit 24. The driver circuit 24 includes switching elements Q1, Q2, Q3, Q4, Q5 and Q6. The switching elements Q1, Q2, Q3, Q4, Q5 and Q6 form a three-phase bridge. Q1, Q3 and Q5 are upper-bridge switches, and Q2, Q4 and Q6 are lower-bridge switches. The switching elements Q1 to Q6 may be field-effect transistors, insulated gate bipolar transistor (IGBTs), or the like. A control terminal of each switching element is electrically connected to the controller 23, and ON states of the switching elements Q1 to Q6 are changed in accordance with a drive signal output from the controller 23, and thereby the state of a voltage and/or current applied by the power supply device 21 to the winding of the motor 27 is changed, and the motor 27 is driven to operate. Of course, the present application may use a driver circuit with any specific number of switches and the motor with any specific number of phases.

Figure 4:
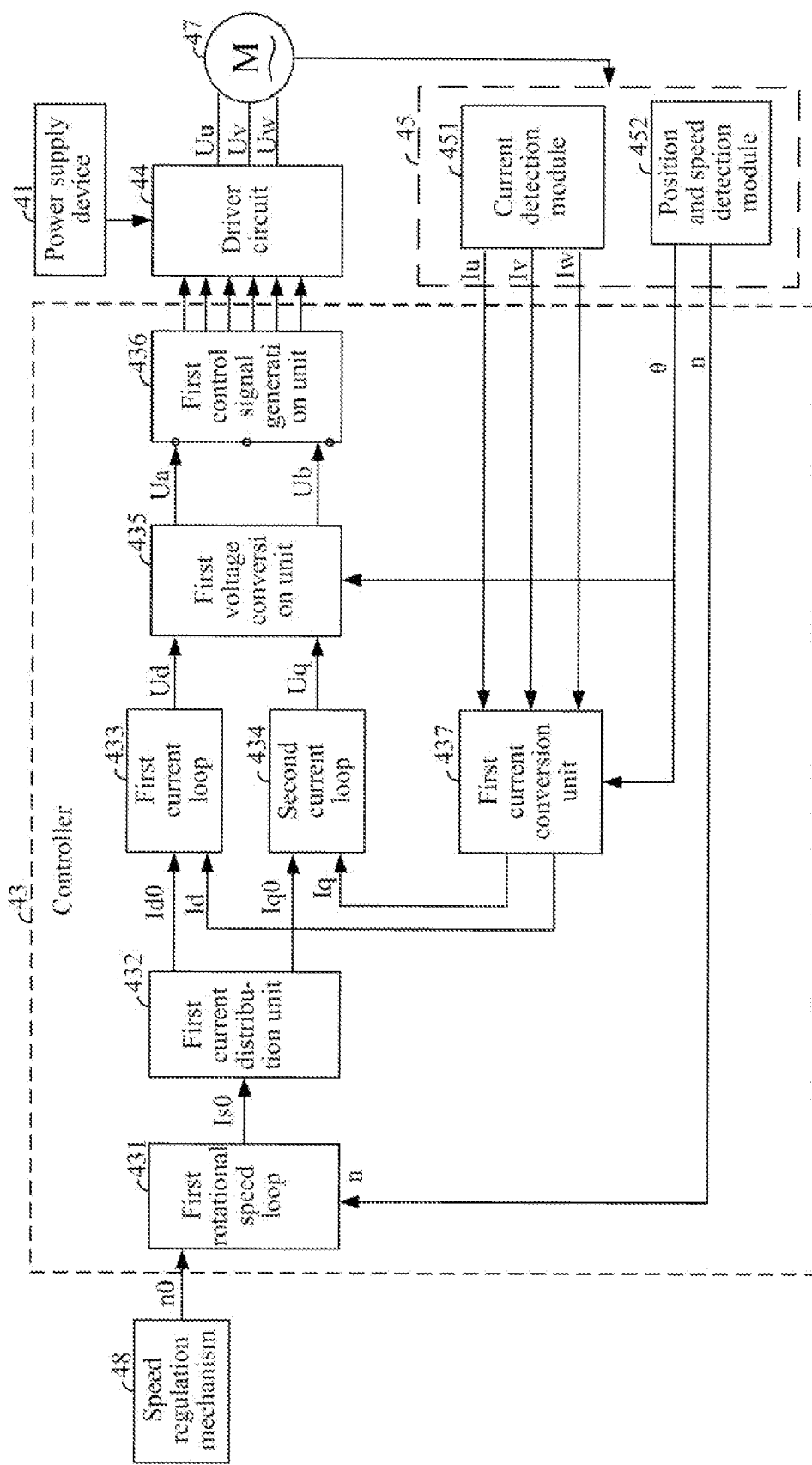
FIG. 4 is an example circuit system of a drill.

Referring to FIG. 4, the controller 43 may include a first rotational speed loop 431, a first current distribution unit 432, a first current loop 433, a second current loop 434, a first voltage conversion unit 435, a first current conversion unit 437, and a first control signal generation unit 436.

A speed regulation mechanism 48 may be the speed regulation mechanism 14 as shown in FIG. 1 and is configured to set a target rotational speed n0 of a motor 47 by users. The first rotational speed loop 431 is connected in association with the speed regulation mechanism 48 and a position and speed detection module 452. Moreover, the first rotational speed loop 431 acquires the target rotational speed n0 of the motor 47 set through the speed mechanism 48 by users and an actual speed n of the motor 47 detected by the position and speed detection module 452.

The first rotational speed loop 431 is configured to generate a target current is0 according to the target rotational speed n0 and the actual rotational speed n of the motor 47. In some examples, the first rotational speed loop 431 can generate the target current is0 according to comparison and regulation of the target rotational speed n0 and the actual rotational speed n of the motor 47.

The first current distribution unit 432 is connected to the first rotational speed loop 431 and is configured to distribute a first target current id0 and a second target current iq0 according to the target current is0. The target current is0, a first target current id0, and a second target current iq0 each are a vector having a direction and magnitude. The directions of the first target current id0 and the second target current iq0 are perpendicular to each other, and the target current is0 is synthesized by the vectors of the first target current id0 and the second target current iq0. The first target current id0 and the second target current iq0 can be obtained according to the following formula:

$$id0 = \frac{-\psi_f + \sqrt{\psi_f^2 + 8(L_q - L_d)^2 I_s^2}}{4(L_q - L_d)} \quad (1)$$

$$iq0 = \text{sign}(I_s)\sqrt{I_s^2 - id0^2}$$

wherein $\psi_f$ is a flux linkage generated by a permanent magnet in the rotor, $L_q$ is an inductance of a q-axis of the stator winding, and $L_d$ is an inductance of a d-axis of the stator winding. $I_s$ is the target current is0 generated by the first rotational speed loop 431 according to the target rotational speed n0 and the actual rotational speed n of the motor 47.

A current detection module 451 transmits the detected three-phase currents Iu, Iv and Iw in actual working of the motor 47 to the first current conversion unit 437 in the controller 43. The first current conversion unit 437 acquires the three-phase currents Iu, Iv and Iw, and performs current conversion to convert the three-phase currents Iu, Iv and Iw into two-phase currents which are a first actual current id and a second actual current iq, respectively.

The first current loop 433 is connected to the first current distribution unit 432 and the first current conversion unit 437, acquires the first target current id0 and the first actual current id, and generates a first voltage regulation amount Ud according to the first target current id0 and the first actual current id.

The second current loop 434 is connected to the first current distribution unit 432 and the first current conversion unit 437, acquires the second target current iq0 and the first actual current iq, and generates a second voltage regulation amount Uq according to the second target current iq0 and the second actual current iq.

The first voltage conversion unit 435 is connected to the first current loop 433 and the second current loop 434, is configured to acquire the first voltage regulation amount Ud and the second voltage regulation amount Uq and a position of a rotor of the motor 47 from the position and speed detection module 452, and can convert the first voltage regulation amount Ud and the second voltage regulation amount Uq into intermediate quantities Ua and Ub related to the three-phase voltages Uu, Uv and Uw applied to the motor 47. Ua and Ub are output to the first control signal generation unit 436. The first control signal generation unit 436 generates a PWM signal according to the intermediate quantities Ua and Ub and the PWM signal is used to control the switching element of a driver circuit 44, so that a power supply device 41 can output the three-phase voltages Uu, Uv and Uw to be applied to a winding of the motor 47. Uu, Uv and Uw are three-phase symmetrical sine wave voltages or saddle wave voltages, and a phase difference between any two of the three-phase voltages Uu, Uv and Uw is 120°.

That is, in this example, the first current distribution unit 432 is configured to distribute a direct-axis target current and a quadrature-axis target current according to a target current of the motor 47 generated by the first rotational speed loop 431. The first current conversion unit 437 is configured to generate a direct-axis actual current and a quadrature-axis actual current according to an actual current of the motor 47 and the position of the rotor of the motor. The first current loop 433 is configured to generate a first voltage regulation amount Ud according to the direct-axis target current and the direct-axis actual current. The second current loop 434 is configured to generate the second voltage regulation amount Uq according to the quadrature-axis target current and the quadrature-axis actual current. The first voltage conversion unit 435 is configured to generate the first voltage control amount Ua and the second voltage control amount Ub according to the first voltage regulation amount Ud and the second voltage regulation amount Uq. The first control signal generation unit 436 generates the control signal according to the first voltage control amount Ua and the second voltage control amount Ub, and the control signal is used to control the driver circuit 44. The control signal is the PWM signal. A duty cycle of the PWM signal varies with the position of the rotor. The controller 43 controls the driver circuit 44 so as to make an input voltage of the motor 47 change approximately in a sine wave. The motor 47 is a three-phase motor, and three-phase input voltages of the motor 47 are at a phase angle of 120° to each other.

A control mode of this example includes that the first current conversion unit 437 acquires information of the three-phase currents Iu, Iv and Iw detected by the current detection module 451 and the position of the rotor and performs current conversion to convert the three-phase currents Iu, Iv and Iw into two-phase currents which are the first actual current id and the second actual current iq, respectively.

The first current loop 433 acquires the first target current id0 and the first actual current id and generates the first voltage regulation amount Ud according to the first target current id0 and the first actual current id.

The second current loop 434 acquires the second target current iq0 and the first actual current iq and generates the second voltage regulation amount Uq according to the second target current iq0 and the second actual current iq.

The first voltage conversion unit 435 acquires the first voltage regulation amount Ud, the second voltage regulation amount Uq and the position of the rotor, converts the first voltage regulation amount Ud and the second voltage regulation amount Uq into the first voltage control amount Ua and the second voltage control amount Ub which are related to the three-phase voltages Uu, Uv and Uw applied to the motor 47, and outputs the first voltage control amount Ua and the second voltage control amount Ub to the first control signal generation unit 436. The first control signal generation unit 436 generates the PWM signal according to the first voltage control amount Ua and the second voltage control amount Ub, and the PWM signal is used to control the switching element of the driver circuit 44, so that the power supply device 41 can output the three-phase voltages Uu, Uv and Uw to be applied to the winding of the motor 47. Uu, Uv and Uw are three-phase symmetrical sine wave voltages or saddle wave voltages, and the phase difference between any two of the three-phase voltages Uu, Uv and Uw is 120°.

Figure 5:
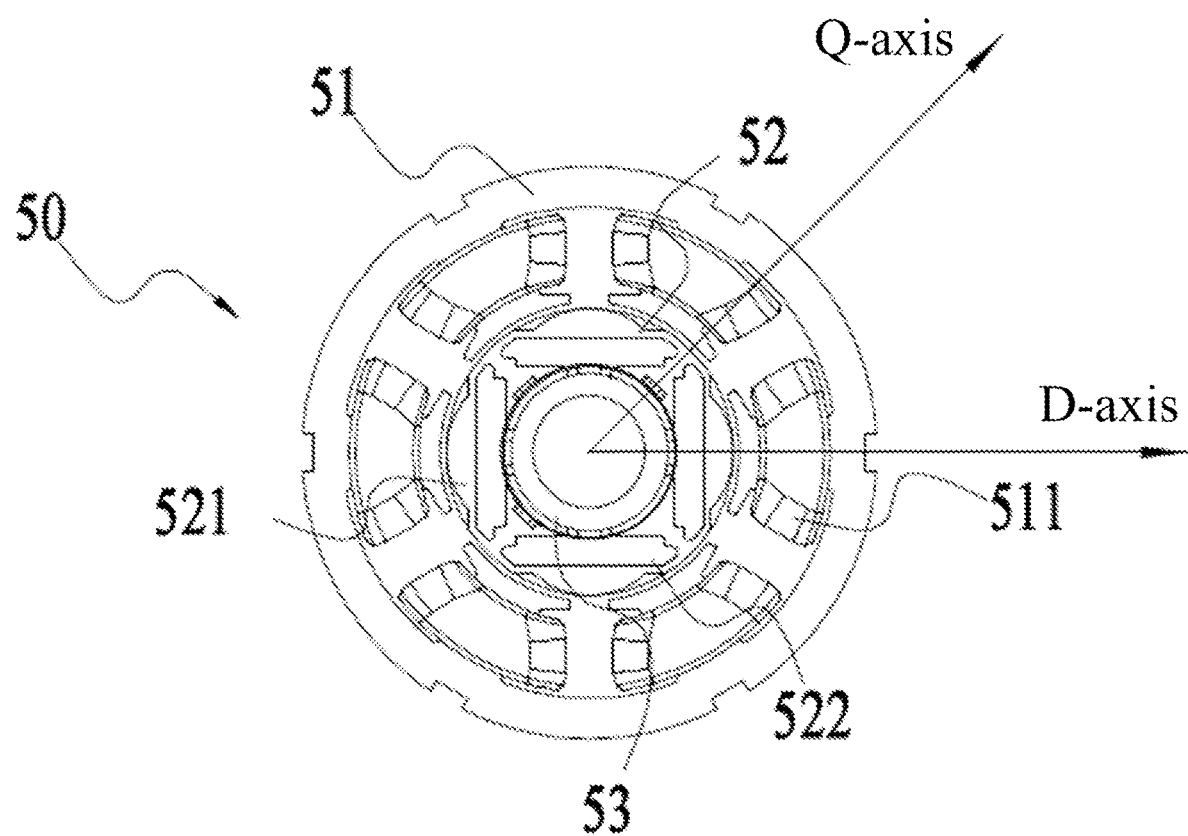
FIG. 5 is a stator and a rotor of a motor according to an example.

The motor 47 may be a motor 50 as shown in FIG. 5. The motor 50 is a permanent magnet brushless motor. The motor 50 includes a stator 511, a rotor 52, and a rotor output shaft 573. The rotor 52 may be disposed within the stator 511 or may be disposed outside the stator 51. In this example, taking an inner-rotor motor as an example, the rotor 52 is disposed within the stator 51, and the rotor output shaft 53 is fixedly connected to the rotor 52. The rotor 52 rotates with the rotor output shaft 53 to drive the functional part to work. The stator 51 includes the stator winding, and the stator winding is disposed in the stator 51. The present application may also have the motor with another number of phases, another number of slots, and another number of poles.

The rotor 52 includes a permanent magnet 521 and a rotor core 522. A slot configured for mounting the permanent magnet 521 is disposed in the rotor core 522, so that inductances (that is, Ld and Lq) of the rotor 52 in the direct-axis (D-axis) and quadrature-axis (Q-axis) directions are not equal. The rotor 52 can generate two different types of torques including a permanent magnet torque T1 generated by the permanent magnet 521 and a reluctance torque T2 generated by the rotor core 522. An electromagnetic torque Te is synthesized by vectors of the permanent magnet torque T1 and the reluctance torque T2 and drives the rotor 52 to rotate. The direct-axis (D-axis) and the quadrature-axis (Q-axis) correspond to the d-axis and the q-axis in both FIG. 7 and FIG. 15, respectively, and an electrical angle between the d-axis and the q-axis is 90°. The d-axis is the direct-axis, and the q-axis is the quadrature-axis.

Figure 6:
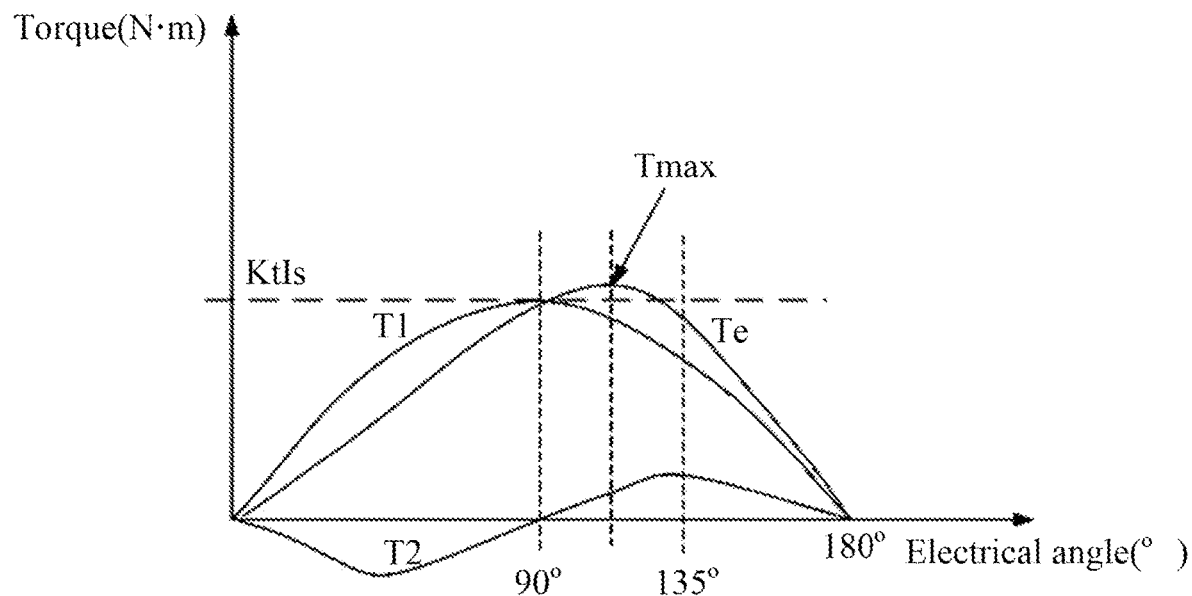
FIG. 6 is a torque-degree characteristic curve of a permanent magnet torque T1, a reluctance torque T2, and an electromagnetic torque Te of a motor.

A relationship among the permanent magnet torque T1, the reluctance torque T2, and the electromagnetic torque Te is shown in FIG. 6. A horizontal axis represents the electrical angle in units of degrees, and a vertical axis represents the torque in units of N.m. The electromagnetic torque Te is synthesized by the vectors of the permanent magnet torque T1 and the reluctance torque T2. The electric angle here is defined as a torque angle of the motor 50 for convenience. The relationship among the permanent magnet torque T1, the reluctance torque T2 and the electromagnetic torque Te has the following formula:

$$Te = 1.5P_n[\Psi_f i_q + (L_d - L_q)i_d i_q]. \quad (2)$$

Two terms are included in the formula. The former $1.5P_n\Psi_f i_q$ is the permanent magnet torque T1, like a curve T1 in FIG. 6. The latter $1.5P_n (L_d-L_q)i_d i_q$ is the reluctance torque T2, like a curve T2 in FIG. 6. Te is synthesized by the curve T1 and the curve T2, like a curve Te in FIG. 6. $\Psi_f$ is a rotor flux linkage, $i_q$ is a q-axis current, $i_d$ is a d-axis current, $L_d$ is a d-axis inductance of the stator winding, and $L_q$ is a q-axis inductance of the stator winding. As can be seen from FIG. 6, the electromagnetic torque Te synthesized has an approximate maximum value Tmax or a maximum value Tmax when the corresponding torque angle is in the range of 90° to 135°. In this example of the present application, in fact, the current id applied to the stator of the motor satisfies that $i_d<0$ in operation. In the above formula, setting $i_d=0$, then $T1=1.5P_n\Psi_f i_q$, that is, in this case, the maximum value of T1 is $1.5P_n\Psi_f$Is (in the case where id=0, $i_q$=Is), where Kt=$1.5P_n y_f$, the maximum value of T1 is KtIs, Is is the phase current input to the motor, $P_n$ is the number of pole pairs of magnets, for example, four magnets have two pole pairs, and $y_f$ is a flux linkage constant of a motor. Then, in the actual operation of the power tool, the current id applied to the stator of the motor satisfies that id<0, and $L_d<L_q$. In this case, the maximum value of Te satisfies that Tmax>KtIs. In this formula, $i_q$ corresponds to the first target current id0 and $i_d$ corresponds to the second target current iq0 in FIG. 4. In some other examples of the present application, the included angle between a stator flux linkage and the rotor flux linkage varies within a value range of 90° to 135° according to actual characteristics and actual currents of different motors.

As an implementation solution, in this example, the controller 43 shown in FIG. 4 is adopted. The controller 43 is configured to adjust, according to at least one of the current of the motor 47, the rotational speed of the motor 47, or the position of the rotor, the current applied to the stator so that the included angle between the stator flux linkage and the rotor flux linkage ranges from 90° to 135°. That is, the controller 43 dynamically controls the current applied to the stator according to the rotational speed, the current and the position of the rotor of the motor 47 obtained directly or by detection to adjust the stator flux linkage, so that the included angle between the stator flux linkage and the rotor flux linkage varies within the value range of 90° to 135°. In some examples, the stator flux linkage can be adjusted according to actual operating conditions of the power tool through a dynamic control of the current applied to the stator according to the rotational speed of the motor and the current of the motor, so that the included angle between the stator flux linkage and the rotor flux linkage is continuously maintained at an angle at which the approximate maximum value Tmax or the maximum value Tmax is obtained. That is, in this case, Tmax continues to be greater than KtIs. Therefore, an output performance of the power tool can be greatly improved. It is to be noted that, in the present application, "the controller according to the at least one of the rotational speed of the motor, the current of the motor, or the position of the rotor of the motor" refers to that the controller obtains the at least one of the rotational speed of the motor, the current of the motor, or the position of the rotor of the motor, and other parameters of these three parameters can be obtained through calculation or estimation according to the parameters obtained. The controller finally obtains the rotational speed of the motor, the current of the motor, and the position of the rotor of the motor according to the parameters obtained directly or indirectly.

In other examples, the value range of the included angle between the stator flux linkage and the rotor flux linkage may also be 90° to 120°. In other examples, the value range of the included angle between the stator flux linkage and the rotor flux linkage may also be 110° to 120°. In other examples, the value range of the included angle between the stator flux linkage and the rotor flux linkage may also be 110° to 130°. In other examples, the value range of the included angle between the stator flux linkage and the rotor flux linkage may also be 105° to 115°. In other examples, the value range of the included angle between the stator flux linkage and the rotor flux linkage may also be 90° to 165°. In optional examples of the present application, the included angle between the stator flux linkage and the rotor flux linkage may be adjusted to maintain at approximately Tmax or Tmax, and then the electromagnetic torque Te synthesized can reach the maximum as much as possible. Thus, an output torque of the motor is greatly increased.

In the optional examples of the present application, the three-phase voltages Uu, Uv, and Uw applied to the motor 47 is controlled so that the included angle between the stator flux linkage and the rotor flux linkage of the motor 47 ranges from 90° to 135°. The three-phase voltages Uu, Uv, Uw are three-phase symmetrical sine wave voltages or saddle wave voltages, and the phase difference between any two of the three-phase voltages Uu, Uv and Uw is 120°.

Figure 7:
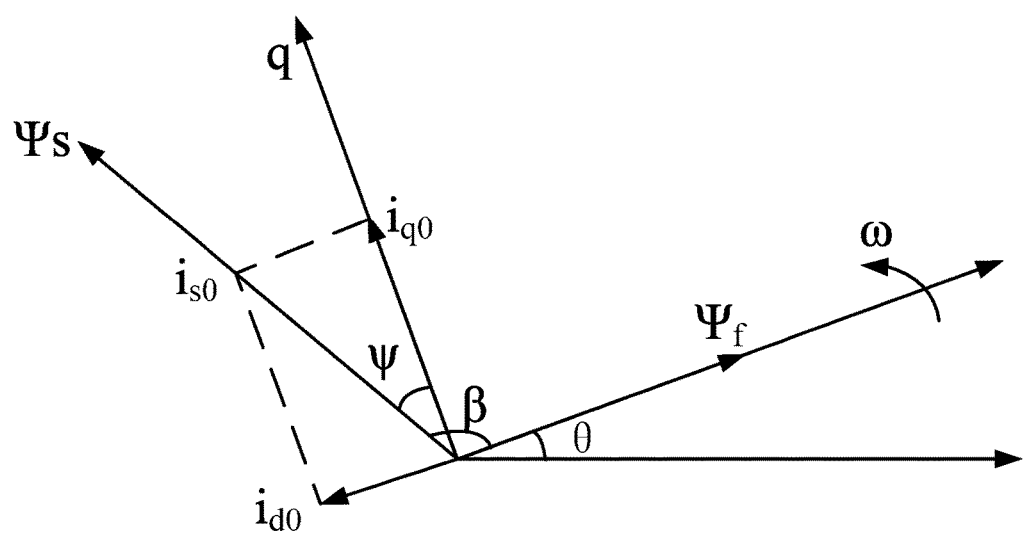
FIG. 7 is a space vector diagram of a stator flux linkage, a rotor flux linkage of a motor, and a current in a direct-quadrature (d-q) coordinate system.

The control mode of the present application is showed from a perspective of a space vector of the motor 47 in FIG. 7. In this example, the controller 43 as shown in FIG. 4 is adopted. The controller 43 controls the current applied to the stator by controlling the three-phase voltages Uu, Uv and Uw applied to the motor 47, so as to make the stator winding generate a space vector is0 of the stator current. The space vector is0 of the stator current is in phase with a space vector Ψs of the stator flux linkage, and an included angle between the stator flux linkage Ψs and a rotor flux linkage Ψf is the torque angle represented by the horizontal axis of the curve shown in FIG. 6. In some examples, according to the rotational speed, the current, and the position of the rotor of the motor 47 obtained directly or by detection, the controller 43 controls the voltage applied to the motor 47 so as to control the current applied to the stator. The voltages applied to the stator are three-phase symmetrical sine wave voltages Uu, Uv and Uw, and the phase difference between any two of the three-phase voltages Uu, Uv and Uw is 120°. The current applied to the stator makes the stator generate the stator flux linkage. The controller 43 dynamically adjusts the current so that the included angle β between the stator flux linkage Ψs and the rotor flux linkage Ψf ranges from 90° to 135°.

Combined with FIGS. 4 and 7, the controller 47 obtains a target speed n0 of the motor 47 through the speed regulation mechanism 48 and an actual speed n of the motor 47 through the position and speed detection module 452 and obtains the target current is0 through a first rotational speed loop according to the target speed n0 and the actual speed n. Then the first current distribution unit 432 distributes the first target current id0 and the second target current iq0 according to the target current is0. The target current is0 in FIG. 4 corresponds to the current space vector is0 in FIG. 7, the first target current id0 in FIG. 4 corresponds to the current id0 of a d-axis component in FIG. 7, and the second target current iq0 corresponds to the current iq0 of a q-axis component in FIG. 7.

According to the three-phase currents Iu, Iv and Iw detected by the current detection module 451 and the position of the rotor of the motor 47 detected by the position and speed detection module 452, the controller 43 obtains the first actual current id and the second actual current iq which are converted by the first current conversion unit 437. Then the first voltage regulation amount Ud is obtained by using the first current loop 433 according to the first target current id0 and the first actual current id. Moreover, the first voltage regulation amount Ud and the second voltage regulation amount Uq are obtained by using the second voltage regulation amount Uq obtained by the second current loop 434 according to the second target current iq0 and the second actual current iq. After the first voltage regulation amount Ud and the second voltage regulation amount Uq are converted by the first voltage conversion unit 435, a result is sent into the first control signal generation unit 436. The first control signal generation unit 436 generates the PWM signal according to the result transmitted by the first voltage conversion unit 435. The PWM signal generated by the first control signal generation unit 436 controls the driver circuit 44 so as to control the three-phase voltages Uu, Uv and Uw applied to the motor 47 by the power supply device 41. The three-phase voltages Uu, Uv and Uw are three-phase symmetrical sine wave voltages or saddle wave voltages, and the phase difference between any two of the three-phase voltages Uu, Uv and Uw is 120°. The three-phase voltages Uu, Uv and Uw applied to the motor 47 can make the stator winding generate the current. The controller 43 controls the stator current to adjust the stator flux linkage, so that the included angle β between the stator flux linkage Ψs and the rotor flux linkage Ψf ranges from 90° to 165°.

In combination with FIGS. 4, 6 and 7, the first current distribution unit 432 in FIG. 4 can make the rotor of the motor 47 generate the permanent magnet torque T1 and the reluctance torque T2 according to the first target current id0 and the second target current iq0 which are distributed according to the target current is0 by the first current distribution unit 432. The electromagnetic torque Te obtained by the motor is synthesized by the vectors of T1 and T2, and Te=1.5$P_n[\psi_f*iq0+(L_d-L_q)id0*iq0]$.

Figure 8:
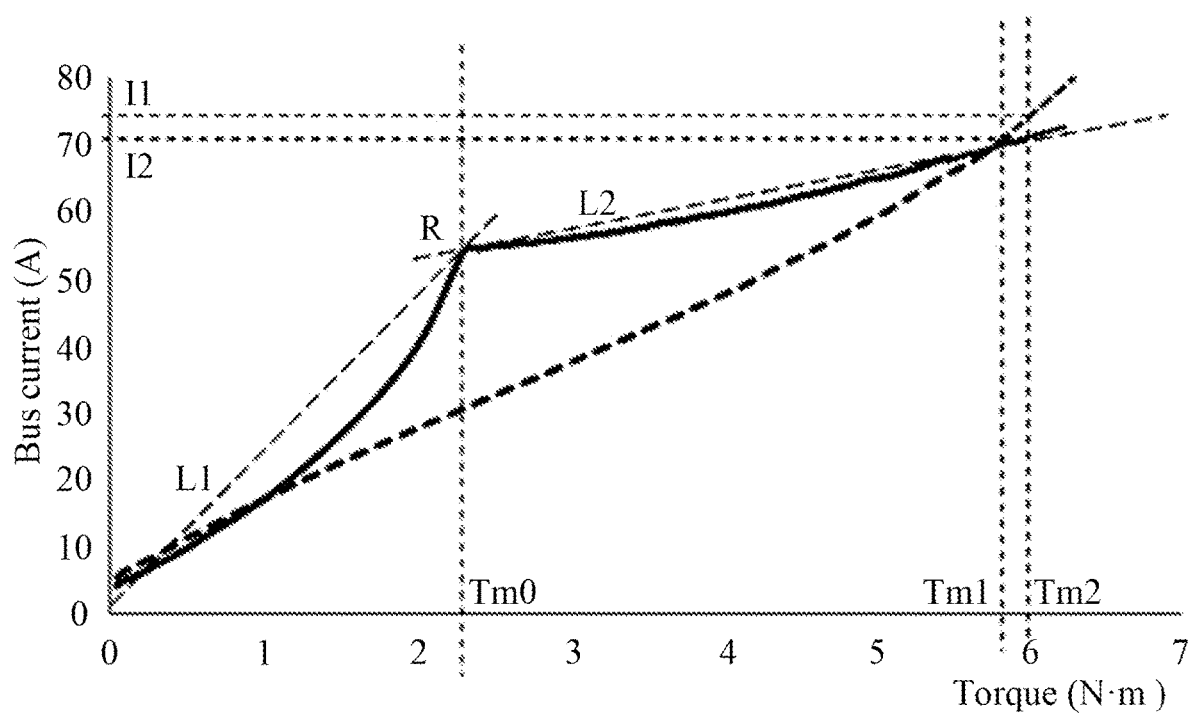
FIG. 8 is a graph of a bus current of a motor versus a motor torque of a drill.

FIG. 8 shows a control mode of the drill shown in FIG. 1 from the perspective of a relation curve between a bus current of a motor and a motor torque. The solid line represents the control mode adopted in this example, and the thick dashed line represents a square wave control mode adopted in the related art. The horizontal axis represents the output torque of the motor in units of N.m, and the vertical axis represents the bus current of the motor in units of A.

This example adopts the circuit system as shown in FIG. 2 and the controller 43 as shown in FIG. 4. The controller 43 controls the current of the motor 47 by controlling the voltage applied by the power supply device 41 to the motor 47. The voltages are the three-phase symmetrical sine wave voltages Uu, Uv and Uw, and the phase difference between any two of the three-phase voltages Uu, Uv and Uw is 120°.

In some examples, the controller 43 dynamically adjusts the current applied to the stator according to the at least one of the rotational speed of the motor 47, the current of the motor, or the position of the rotor of the motor so as to make the bus current of the motor changes according to a first current-torque characteristic curve in a first torque interval (that is, a torque interval from 0 to Tm0) and changes according to a second current-torque characteristic curve in a second torque interval (that is, a torque interval from Tm0 to Tm1). A slope of a first virtual line L1 in which 0, Tm0 are located is defined as a first slope in the first current-torque characteristic curve, and a slope of a second virtual line L2 in which Tm0 and Tm1 are located is defined as a second slope in the second current-torque characteristic curve. The first slope of the first virtual line L1 in which the first current-torque characteristic curve is located is greater than the second slope of the second virtual line L2 in which the second current-torque characteristic curve is located. Optionally, the first slope is the slope of any point of the first current-torque characteristic curve in the first torque interval (that is, the torque interval from 0 to Tm0), and the second slope is the slope of any point of the second current-torque characteristic curve in the second torque interval (that is, the torque interval from Tm0 to Tm1). That is, a bus current of the motor 47 has an inflection point R, and the first slope before the inflection point R is greater than the second slope after the inflection point R. That is, before the inflection point, the bus current of the motor increases at a relatively high speed with the motor torque, and after the inflection point, the bus current of the motor increases at a relatively low speed with the motor torque. That is, the bus current of the first current-torque characteristic curve and the bus current of the second current-torque characteristic curve increase as the torque increases, but the current increases at a higher speed as the torque increases in the first current-torque characteristic curve, and the current increases at a lower speed as the torque increases in the second current-torque characteristic curve. That is, in the control mode of this example, in the case of light load of the power tool 10, the current increases at a higher speed; and in the case of heavy load of the power tool 10, the current increases at a lower speed.

Referring to FIG. 8, the control mode of the present application is adopted. In response to the controller 43 controlling the driver circuit 44 to make the motor 47 rotate at a preset torque, an output current of the power supply device 41 is a second output current. In response to the controller 43 controlling the driver circuit 44 in a first control mode to make the motor 47 rotate at a preset torque, an output current of the power supply device 41 is a first output current. The second output current is less than the first output current. In this example, the first control mode is the square wave control mode in the related art.

It is to be noted that in the present application "in response to the controller controlling the driver circuit in the first control mode" or "in response to the controller controlling the driver circuit in a third control mode" is merely used to compare the control mode in the present application with other control methods. Optionally, the first control mode and the third control mode are square wave control mode in the related art. That is, the controller 43 in the present application is merely configured to implement the control mode of the present application and is not configured to implement the first control mode or the third control mode to control the driver circuit 44. "In response to the controller controlling the driver circuit in the first control mode" or "in response to the controller controlling the driver circuit in the third control mode" as described above is not repeated below.

In an example, the preset torque is set to Tm2; in this case, the square wave control mode in the related art is adopted to make the first output current output from the power supply device 41 correspond to a bus current I1 of the motor in FIG. 8, and the control mode in this example is adopted to make the second output current output from the power supply device 41 correspond to a bus current I2 of the motor in FIG. 8. The second output current I2 is less than the first output current I1.

Figure 11:
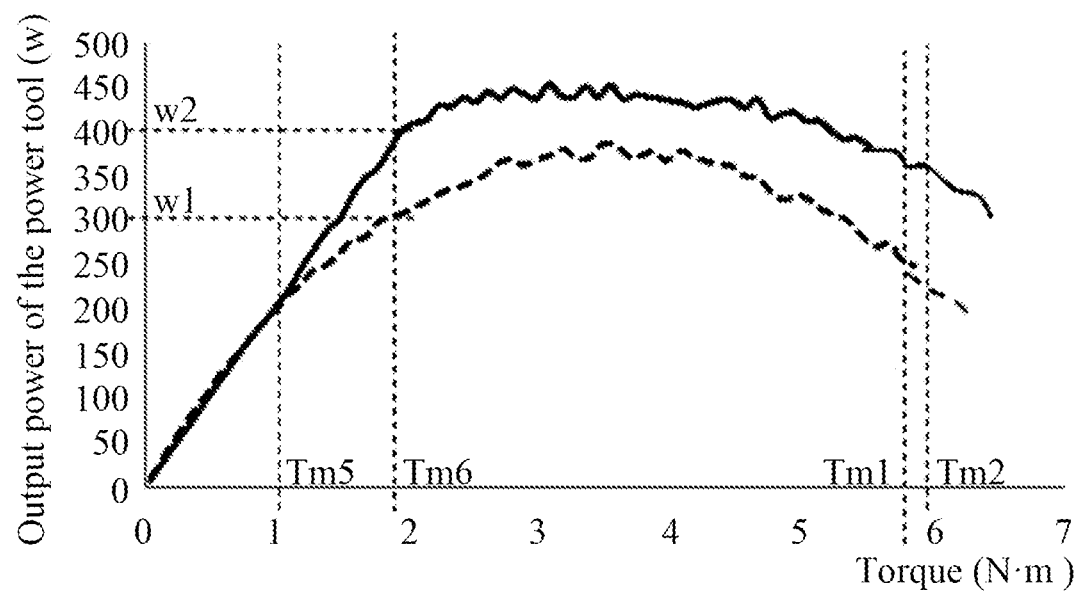
FIG. 11 is a graph of an output power versus a motor torque of a drill.

In combination with FIGS. 8 and 11, through such control mode, the control mode of this example is compared with the square wave control mode in the related art in the heavy-load region. With the same output torque, the bus current of the motor 47 is less, the output current of the power supply device 41 is less, and the output power of the power tool 10 is higher, which can save energy. For the battery pack being used as the power supply device 41, an endurance capacity of the battery pack can be improved.

Figure 9:
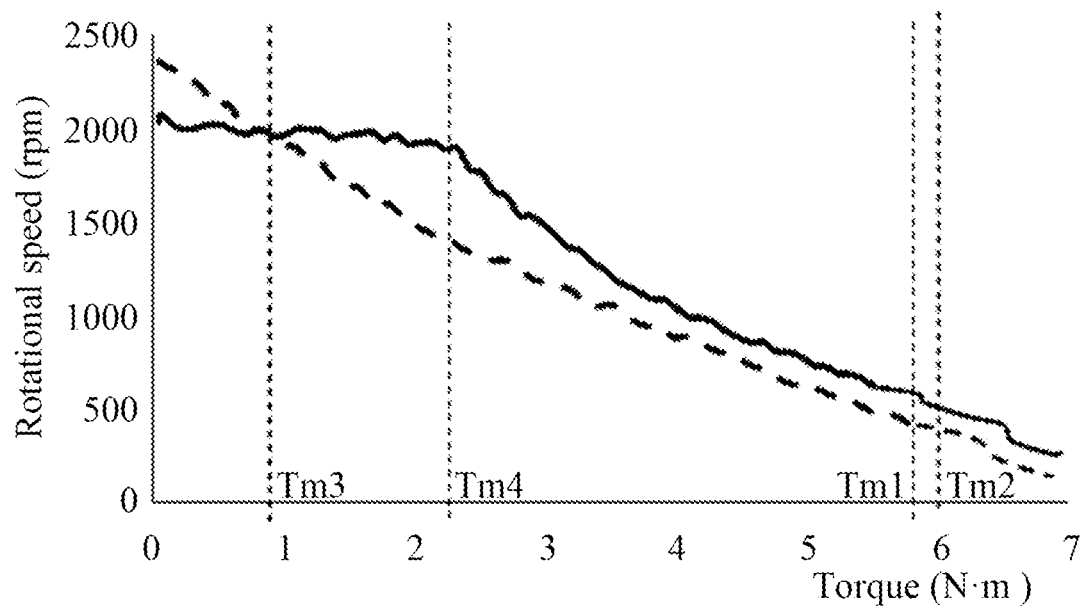
FIG. 9 is a graph of a rotational speed of a motor versus a motor torque of a drill.

FIG. 9 shows the control mode of the drill shown in FIG. 1 from the perspective of the relation curve between the rotational speed of the motor and the motor torque. This example adopts the circuit system as shown in FIG. 2 and the controller 43 as shown in FIG. 4. The controller 43 controls the current of the motor 47 by controlling the voltage applied by the power supply device 41 to the motor 47. The voltages are the three-phase symmetrical sine wave voltages Uu, Uv and Uw, and the phase difference between any two of the three-phase voltages Uu, Uv and Uw is 120°.

In some examples, the controller 43 dynamically adjusts the current applied to the stator according to the at least one of the rotational speed of the motor 47, the current of the motor, or the position of the rotor of the motor. The controller 43 controls the current applied to the stator by controlling the voltage applied to the motor 47. The voltages applied to the stator are three-phase symmetrical sine wave voltages Uu, Uv and Uw, and the phase difference between any two of the three-phase voltages Uu, Uv and Uw is 120°. The current applied to the stator makes the stator generate the stator flux linkage. The controller 43 dynamically adjusts the current in the stator so as to make the included angle between the stator flux linkage and the rotor flux linkage range from 90° to 135°.

When the controller 43 of this example controls the driver circuit 44, the motor 47 obtains a second constant-speed torque interval. In response to the controller 43 controlling the driver circuit 44 in the first control mode, the motor 47 obtains a first constant-speed torque interval. The length of the second constant-speed torque interval is greater than the length of the first constant-speed torque interval.

In FIG. 9, the horizontal axis represents the output torque of the motor in units of N.m and the vertical axis represents the rotational speed n of the motor in units of rpm. The solid line is an effect curve showing the variation of the rotational speed of the motor with the motor torque when the control mode of this example is adopted, and the thick dashed line indicates an effect curve showing the variation of the rotational speed of the motor with the motor torque when the square wave control mode in the related art is adopted. In this example, the rotational speed of the motor is substantially in a constant-speed state within the interval from 0 to Tm4, and such a long constant-speed interval does not exist in the square wave control mode in the related art.

As can be seen from FIG. 9, the control mode of this example has an advantage of a wide constant-speed range compared with the square wave control mode in the related art. Some power tools such as the drill and the screwdriver within a light-load range or a medium-load range when working have a characteristic of having a relatively wide constant-speed range can obtain a better and more consistent working effect.

In this example, in response to the controller 43 controlling the driver circuit 44 to make the motor 47 rotate in the preset torque interval, the motor 47 obtains a second rotational speed; in response to the controller 43 controlling the driver circuit 44 in the first control mode to make the motor rotate in the preset torque interval, the motor obtains a first rotational speed. The second rotational speed is greater than the first rotational speed. Referring to FIG. 9, optionally, the preset torque interval is set to the torque interval (that is, greater than Tm4) having the torques greater than Tm4. For example, in the torque interval from Tm3 to Tm2 in FIG. 9, the control mode of the present application is adopted. When the motor outputs the same torque (for example, Tm2), the rotational speed of the motor is higher than the rotational speed of the motor in the square wave control mode in the related art. For power tools such as the drill, a higher rotational speed of the motor refers to a higher working efficiency. In addition, in combination with FIGS. 8 and 9, at the preset torque (for example, Tm2), the rotational speed of the motor in the control mode of the present application is higher than the rotational speed of the motor in the square wave control mode in the related art, but the required current in the control mode of the present application is less than the required current in the square wave control mode in the related art. That is, in the control mode of the present application, a higher rotational speed can be obtained through a less current. For the power tool using the battery pack as the power supply device 41, the endurance capacity of the battery pack can be improved.

Figure 10:
FIG. 10 is a graph of a motor efficiency versus a motor torque of a drill.

The effect of the control method of this example is compared with the effect of the square wave control method in the related art from the perspective of the relation curve between the motor efficiency and the motor torque in FIG. 10. The horizontal axis represents the output torque of the motor in units of N.m and the vertical axis represents the motor efficiency in no unit. The solid line is the effect curve showing the variation of the motor efficiency with the motor torque in the control mode of this example, and the thick dashed line indicates the effect curve showing the variation of the motor efficiency with the motor torque in the square wave control mode in the related art. As can be seen from FIG. 10, the motor efficiency in the control mode of this example is higher than the motor efficiency in the square wave control mode in the related art.

FIG. 11 shows the control mode of the drill shown in FIG. 1 from the perspective of the relation curve between the output power of the power tool and the motor torque. The horizontal axis represents the output torque of the motor in units of N.m, and the vertical axis represents the output power of the power tool in units of W. The solid line is the curve when the control mode of this example is adopted, and the thick dashed line is the curve when the square wave control mode in the related art is adopted.

In this example, in response to the controller 43 controlling the driver circuit 44 to make the motor 47 rotate at the preset torque (for example, Tm6) in the preset torque interval (for example, greater than Tm5), the output power of the power tool 10 is second output power w2. In response to the controller 44 controlling the driver circuit 44 in the first control mode to make the motor 47 rotate at the preset torque (for example, Tm6) in the preset torque interval (for example, greater than Tm5), the output power of the power tool 10 is first output power w1. The second output power w2 is greater than the first output power w1. In this example, the first control mode is the square wave control mode in the related art.

As can be seen from FIG. 11, compared with the square wave control mode in the related art, the control mode of this example can make the output power of the power tool 10 higher in the case where the output torque of the motor 47 is the same. In combination with FIGS. 8 and 11, when the motor rotates at a preset torque (for example, Tm2) in a preset torque interval (for example, greater than Tm1), the output current of the power supply device 41 is less and the output power of the power tool is higher in the control mode of the present application compared with the square wave control mode in the related art, so that the endurance capacity of the battery pack as the power supply device 41 can be higher.

In combination with FIGS. 8, 9 and 11, when the motor rotates at a preset torque (for example, Tm2) in a preset torque interval (for example, greater than Tm1), the output current of the power supply device 41 is less, the output power of the power tool 10 is higher and the rotational speed of the motor 47 is higher in the control mode of the present application compared with the square wave control mode in the related art, so that the endurance capacity of the battery pack as the power supply device 41 can be higher.

Of course, in the above-mentioned example, the controller 43 of FIG. 4 is adopted to indirectly control the stator flux linkage by controlling the current vector or the voltage vector so as to adjust the included angle between the stator flux linkage and the rotor flux linkage. In some examples, a controller 73 of FIG. 14 may also be adopted to adjust the included angle between the stator flux linkage and the rotor flux linkage by directly controlling the stator flux linkage, so that the same effect can be achieved. In some examples, the controller 73 includes a second rotational speed loop 731 which is configured to generate a target torque of a motor 77 according to the target rotational speed and an actual rotational speed of the motor 77. The controller 73 further includes a torque loop 733, a flux linkage loop 734, a second voltage conversion unit 735 and a second control signal generation unit 736. The torque loop 733 is configured to generate a third voltage regulation amount v1 according to a target torque and an actual torque of the motor 77. The flux linkage loop 734 is configured to generate a fourth voltage regulation amount v2 according to a target stator flux linkage and an actual stator flux linkage of the motor 77. The second voltage conversion unit 735 is configured to generate a third voltage control amount Uα and a fourth voltage control amount Uβ according to the third voltage regulation amount v1 and the fourth voltage regulation amount v2. The second control signal generation unit 736 is configured to generate a control signal according to the third voltage control amount Uα and the fourth voltage control amount Uβ, and the control signal is used for controlling the driver circuit.

Figure 12:
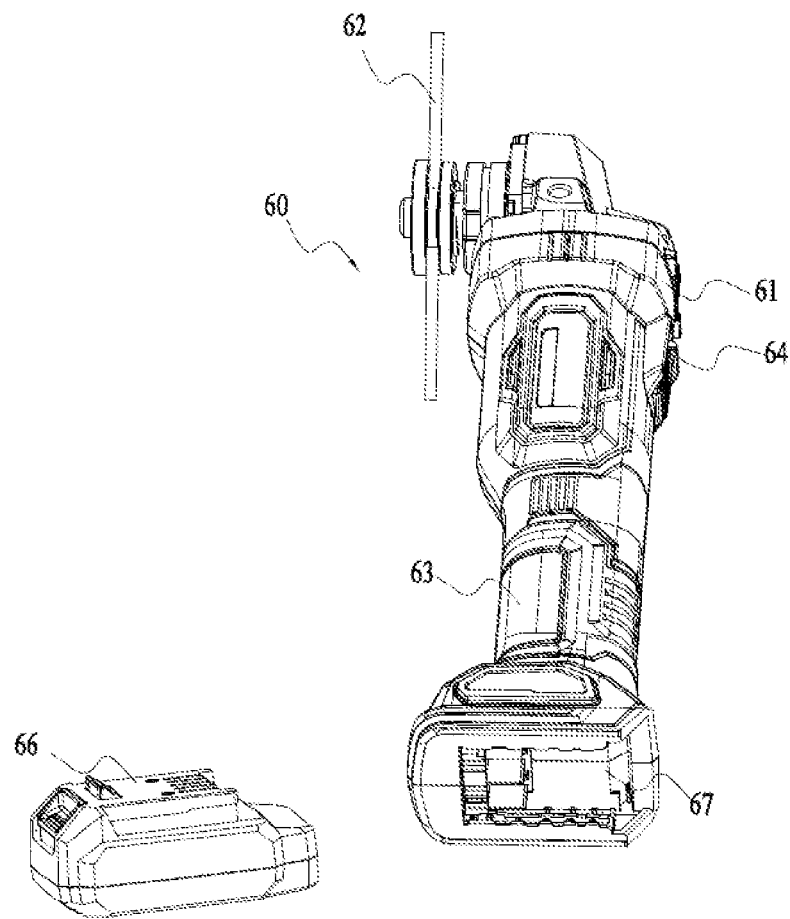
FIG. 12 is an appearance view of an angle grinder.
Figure 13:
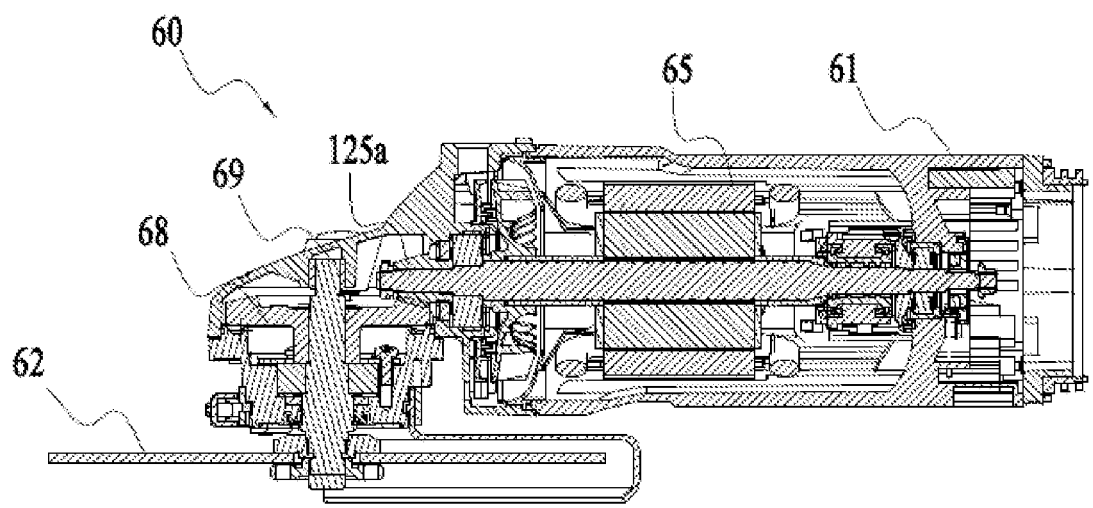
FIG. 13 is a sectional view of a portion of the angle grinder of FIG. 12.

Exemplarily, FIG. 12 and FIG. 13 show another power tool 60. The power tool 60 is an angle grinder which mainly includes a housing 61, a functional part 62, a grip 63, a speed regulation mechanism 64, a motor 65, and a power supply device 66.

The housing 61 is formed with the grip 63. The grip 63 is for users to hold. In some examples, the grip 63 can be configured as a separate component. The housing 61 constitutes a main body portion of the power tool 60 for accommodating the motor 65, the transmission mechanism, and other electronic components such as the circuit board. A front end of the housing 61 is configured for mounting the functional part 62.

The functional part 62 is configured to achieve a function of the power tool 60, and the functional part 62 is driven by the motor 65. For different power tools 60, functional parts are different. For the angle grinder, the functional part 62 is a grinding disc configured to implement a grinding or cutting function. The functional part 62 is operatively connected to the motor 65. In some examples, the functional part 62 is electrically connected to the motor 65 through an output shaft 69 and a transmission mechanism 68.

The speed regulation mechanism 64 is configured to set the target rotational speed of the motor 65, that is, the speed regulation mechanism 64 is configured to achieve the speed regulation of the motor 65. The speed regulation mechanism 65 may be the trigger, the knob, a sliding mechanism, or the like. In this example, the speed regulation mechanism 64 is configured as the sliding mechanism.

The power supply device 66 is configured to supply electrical energy for the power tool 60. In this example, the battery pack is adopted to supply power for the power tool 60. Optionally, the power tool 60 further includes a battery pack junction 67 configured to connect the battery pack to the power tool 60. In other examples, the power supply device 66 may also be an alternating current power supply. The alternating current power supply may be the 60V or 220V utility power. The power supply device 66 includes the power conversion unit. The power conversion unit is connected to the alternating current and configured to convert the alternating current into the electrical energy available for the use of the power tool 60.

Figure 14:
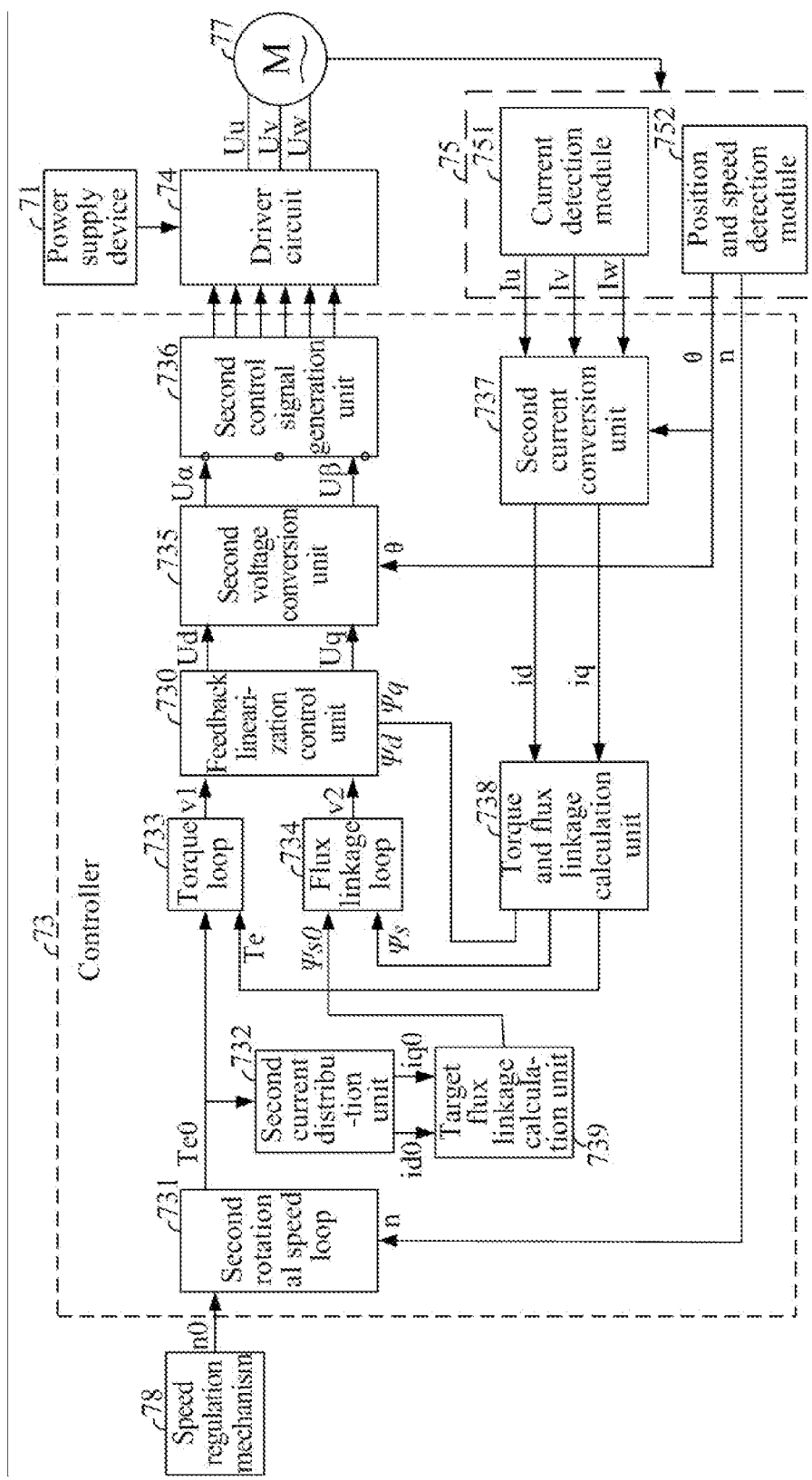
FIG. 14 is an example circuit system of an angle grinder.

Operation of the above power tool 60 also depends on the circuit system. Referring to FIG. 14, taking the circuit system as an example, the controller 73 includes the second rotational speed loop 731, a second current distribution unit 732, the torque loop 733, the flux linkage loop 734, the second voltage conversion unit 735, the second control signal generation unit 736, a second current conversion unit 737, a torque and flux linkage calculation unit 738, a target flux linkage calculation unit 739, and a feedback linearization control unit 730. The feedback linearization control unit 730 and the second voltage conversion unit 735 can be collectively referred to as voltage change units both of which implement voltage conversion.

Figure 15:
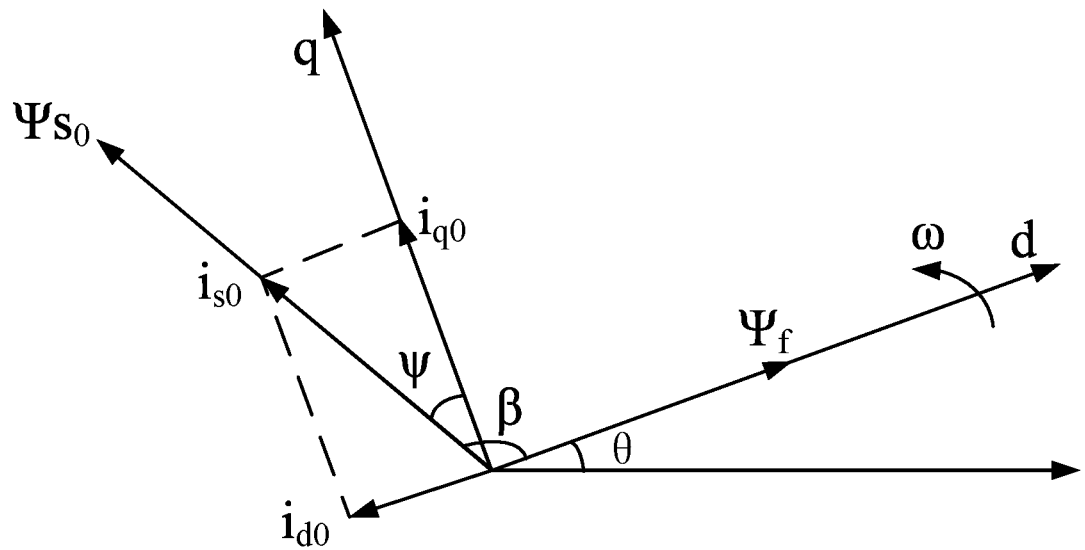
FIG. 15 is a space vector diagram of a stator flux linkage, a rotor flux linkage of a motor, and a current in a direct-quadrature (d-q) coordinate system.
Figure 16:
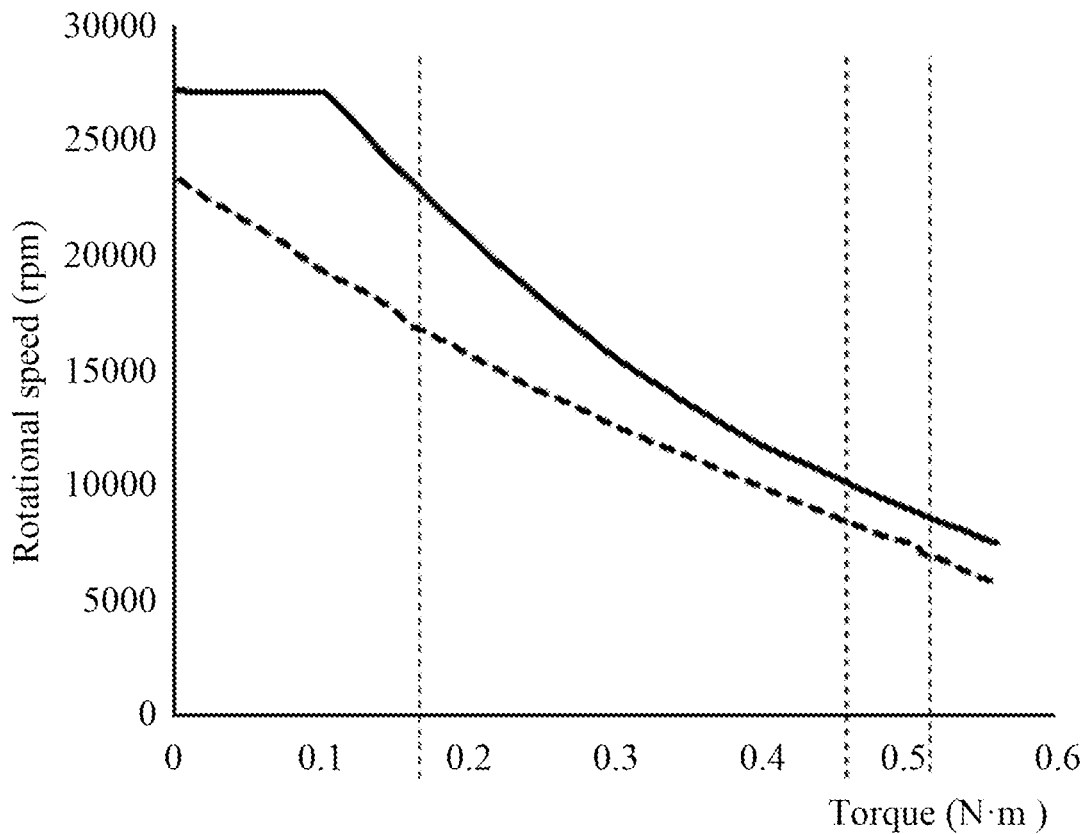
FIG. 16 is a graph of a rotational speed of a motor versus a motor torque of an angle grinder.
Figure 17:
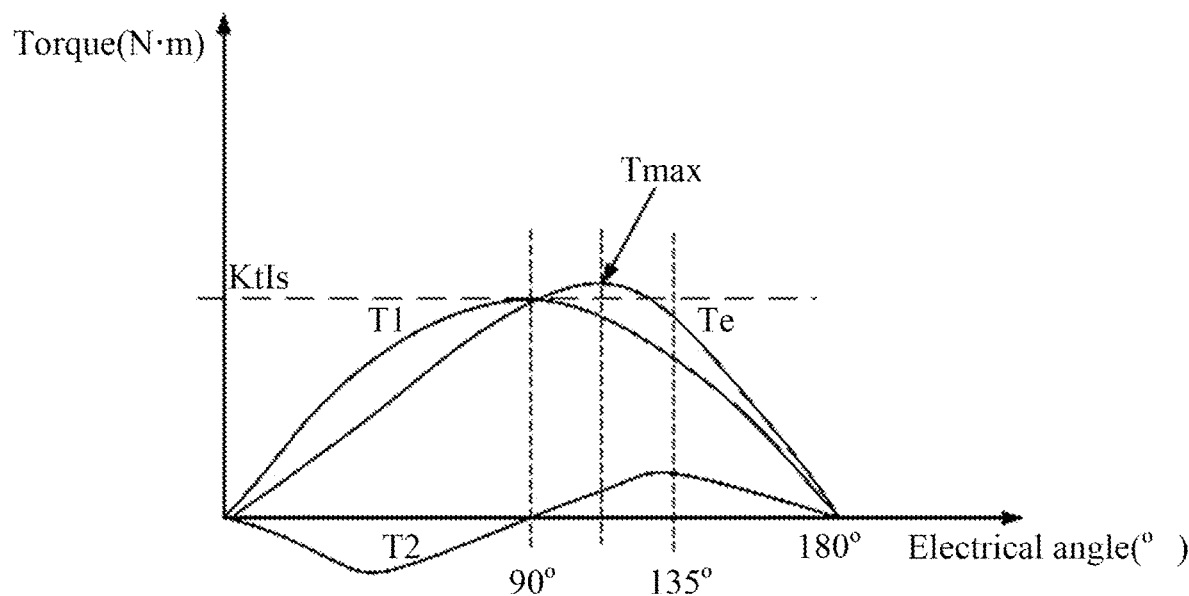
FIG. 17 is a torque-angle relational curve of a permanent magnet torque T1, a reluctance torque T2, and an electromagnetic torque Te of a motor.

Referring to FIGS. 15 to 17, the controller 73 is configured to perform following operations. In a first load interval (0 to Tn1), a driver circuit 74 is controlled in a first characteristic control mode so as to make the motor 77 rotate within a range of the first rotational speed. In a second load interval (greater than Tn1), the driver circuit 74 is controlled in a second characteristic control mode so as to make the motor 77 rotate within a range of the second rotational speed. The first characteristic control mode includes: according to at least one of a current of the motor 77, a rotational speed of the motor 77, or a position of the rotor of the motor 77, dynamically adjusting a current applied to the stator so that an included angle β between a stator flux linkage and a rotor flux linkage range from 135° to 180°. The second characteristic control mode includes: according to the at least one of the current of the motor 77, the rotational speed of the motor 77, or the position of the rotor of the motor 77, dynamically adjusting the current applied to the stator so that the included angle β between the stator flux linkage and the rotor flux linkage range from 90° to 135°. The output torque of the motor 77 when the controller 73 controls the driver circuit 74 in the second characteristic control mode is greater than the output torque of the motor 77 when the controller 73 controls the driver circuit 74 in the first characteristic control mode (see FIG. 17). The output torque of the motor is positively correlated with the electromagnetic torque Te of the motor. The greater the electromagnetic torque Te of the motor, the greater the output torque of the motor.

That is, in the first load interval (torque interval section from 0 to Tn1), the controller 77 performs control in the first characteristic control mode in which the included angle between the stator flux linkage and the rotor flux linkage is regulated. In the second load interval (torque interval section of torques greater than the Tn1), the controller 77 performs control in the second characteristic control mode in which the included angle between the stator flux linkage and the rotor flux linkage is regulated and the approximate Tmax or Tmax is obtained. In some examples, the first characteristic control mode includes: according to the at least one of the current of the motor 77, the rotational speed of the motor 77, or the position of the rotor of the motor 77, dynamically adjusting the current applied to the stator so that the included angle β between the stator flux linkage and the rotor flux linkage ranges from 135° to 180° and the torque of the motor 77 operates at a value not greater than or less than or equal to a preset threshold KtIs. Kt=1.5PnΨf, Pn is the number of pole pairs of magnets, for example, four magnets have two pole pairs, and Ψf is the flux linkage constant of the motor. Is is the phase current of the motor. The second characteristic control mode includes: according to the at least one of the current of the motor 77, the rotational speed of the motor 77, or the position of the rotor of the motor 77, dynamically adjusting the current applied to the stator so that the included angle β between the stator flux linkage and the rotor flux linkage ranges from 90° to 135°, and the torque of the motor 77 operates at a value continuously greater than the preset threshold KtIs within a preset time range. Kt=1.5PnΨf, Pn is the number of pole pairs of magnets, for example, four magnets have two pole pairs, and Ψf is the flux linkage constant of the motor. Is is the phase current of the motor. The output torque of the motor 77 when the controller 73 controls the driver circuit 74 in the second characteristic control mode is greater than the output torque of the motor 77 when the controller 73 controls the driver circuit 74 in the first characteristic control mode.

In some other examples of the present application, in the first characteristic control mode, the value range of the included angle between the stator flux linkage and the rotor flux linkage may be regulated to be 90° to 120°, or 90° to 135°, or 110° to 120°, or 110° to 130°, or 110° to 140°, or 105° to 135°, or 115° to 145°, or 120° to 160°, or 135° to 165°, or 150° to 180° so that the torque of the motor 77 operates at a value not greater than the preset threshold KtIs. In the second characteristic control mode, the value range of the included angle between the stator flux linkage and the rotor flux linkage may be regulated to be 110° to 120°, or 110° to 130°, or 105° to 115°, or 115° to 135°, or 120° to 145°, but the torque of the motor 77 operates at a value continuously greater than the preset threshold KtIs within the preset time range. In some examples, the second rotational speed loop 731 in the controller 73 acquires the actual rotational speed n of the motor 77 from the position and speed detection module 752 and the target rotational speed n0 of the motor set by users through a speed regulation mechanism 78 and outputs the target electromagnetic torque Te0 according to the actual rotational speed n of the motor and the target rotational speed n0 of the motor. The speed regulation mechanism 78 may adopt the speed regulation mechanism 64 as shown in FIG. 12.

The second current distribution unit 732 distributes a first target current id0 and the second target current iq0 according to a target torque Te0 output from the second rotational speed loop 731. Referring to FIG. 15, the first target current id0 and the second target current iq0 are vectors having directions and magnitude, and the electrical angle between the first target current id0 and the second target current iq0 is 90°. The first target current id0 and the second target current iq0 are located on the d-axis and the q-axis, respectively, and the target current is0 is synthesized by the vectors of the first target current id0 and the second target current iq0. The target flux linkage calculation unit 739 can calculate a target stator flux linkage Ψs0 according to the first target current id0 and the second target current iq0, and the target stator flux linkage Ψs0 is in the same direction as the target current is0. In this manner, the controller 73 directly dynamically adjusts the stator flux linkage to control the included angle β between the stator flux linkage Ψs and the rotor flux linkage Ψf within the range of 90° to 135° or 135° to 180° to improve the output performance of the power tool under different actual operating conditions.

The target stator flux linkage Ψs0 and the target electromagnetic torque Te0 are compared with the actual stator flux linkage Ψs and the actual electromagnetic torque Te and adjusted, and the control signal is generated to adjust the actual stator flux linkage Ψs and the actual electromagnetic torque Te so as to make the actual stator flux linkage Ψs and the actual electromagnetic torque Te reach the target stator flux linkage Ψs0 and the target electromagnetic torque Te0 as much as possible. Optionally, the included angle between the actual stator flux linkage Ψs and the rotor flux linkage Ψf may be in the range of 90° to 135° or 135° to 180°. That is, a Te=f(Ψs, Ψf, β) functional relationship is established and the stator flux linkage is dynamically adjusted so that the value range of the included angle between the actual stator flux linkage Ψs and the actual rotor flux linkage Ψf is 90° to 135°. In some other examples of the present application, the Te=f(Ψs, Ψf, β) functional relationship may be established and the stator flux linkage may also be dynamically adjusted so that the value range of the included angle between the stator flux linkage and the rotor flux linkage may also be 90° to 120°, or 110° to 120°, or 110° to 130°, or 110° to 140°, or 105° to 115°, or 115° to 145°, or 120° to 160°, or 135° to 165°.

In some examples, the second current conversion unit 737 acquires the three-phase currents Iu, Iv and Iw detected by a current detection module 751 and a position θ of the rotor output from the position and speed detection module 452, and then the three-phase currents Iu, Iv and Iw are converted into two-phase actual currents id and iq. id and iq are vectors having directions and magnitude, and the directions of id and iq are perpendicular to each other.

The torque and flux linkage calculation unit 738 acquires the two-phase actual currents id and iq from the second current conversion unit 737 and generates the actual electromagnetic torque Te and an actual stator flux linkage Ψs according to the two-phase actual currents id and iq. The actual electromagnetic torque Te is output to the torque loop 733 and the actual flux linkage Ψs is output to the flux linkage loop 734.

The torque loop 733 acquires the actual torque Te calculated by the torque and flux linkage calculation unit 738 and the target electromagnetic torque Te0 output from the second rotational speed loop 731 and generates the voltage regulation amount v1 according to the actual electromagnetic torque Te and the target electromagnetic torque Te0.

The flux linkage loop 734 acquires the actual stator flux linkage Ψs calculated by the torque and flux linkage calculation unit 738 and the target stator flux linkage Ψs0 generated by the target flux linkage calculation unit 739 and generates the voltage regulation amount v2 according to the actual stator flux linkage Ψs and the target stator flux linkage Ψs0.

The feedback linearization control unit 730 generates a voltage control amount Uq and a voltage control amount Ud in a d-q coordinate system according to the voltage regulation amount v1 generated by the torque loop 733, the voltage regulation amount v2 generated by the flux linkage loop 734, and the d-axis component $\Psi d$ and q-axis component $\Psi q$ of the actual stator flux linkage $\Psi s$ generated by the torque and flux linkage calculation unit 738 and according to v1, v2, $\Psi d$ and $\Psi q$.

The second voltage conversion unit 735 acquires a first voltage control amount Uq and a second voltage control amount Ud, and converts the voltage control amount Uq and the voltage control amount Ud into a voltage control amount Uα and a voltage control amount Uβ in a α-β coordinate system.

The second control signal generation unit 736 generates, according to the voltage control amount Uα and the voltage control amount Uβ in the α-β coordinate system, a PWM control signal for controlling the driver circuit 74, so that the power supply device 71 outputs the three-phase voltages Uu, Uv and Uw to be applied to the winding of the motor 77. Uu, Uv and Uw are three-phase symmetrical sine wave voltages or saddle wave voltages, and the phase difference between any two of the three-phase voltages Uu, Uv and Uw is 120°. The three-phase voltages Uu, Uv, and Uw applied to the motor 77 make the included angle between the stator flux linkage $\Psi s0$ and the rotor flux linkage $\Psi f$ in the range of 90° to 135° or 135° to 180°.

That is, the second rotational speed loop 731 is configured to generate the target torque of the motor according to the target rotational speed and the actual rotational speed of the motor 77. The torque loop 733 is configured to generate the third voltage regulation amount v1 according to the target torque and the actual torque of the motor 77. The flux linkage loop 734 is configured to generate the fourth voltage regulation amount v2 according to the target stator flux linkage and the actual stator flux linkage of the motor 77. The second voltage conversion unit 735 is configured to generate the third voltage control amount Uα and the fourth voltage control amount Uβ according to the third voltage regulation amount v1 and the fourth voltage regulation amount v2. Optionally, the controller 73 further includes the feedback linearization control unit 730. An input terminal of the feedback linearization control unit 730 is connected to the torque loop 733 and the flux linkage loop 734, and an output terminal of the feedback linearization control unit 730 is connected to the second voltage conversion unit 735. The second control signal generation unit 736 is configured to generate the control signal according to the third voltage control amount Uα and the fourth voltage control amount Uβ. The control signal is used for controlling the driver circuit 74. The control signal is the PWM signal, and the duty cycle of the PWM signal varies with the position of the rotor. The controller 73 controls the driver circuit 74 so as to make the input voltage of the motor 77 change approximately in the sine wave. The motor 77 is a three-phase motor, and three-phase input voltages of the motor 77 are at the phase angle of 120° to each other.

In this manner, direct torque control is performed directly according to the actual fed back electromagnetic torque and stator flux linkage, so that the included angle β between the stator flux linkage $\Psi s$ and the rotor flux linkage $\Psi f$ of the motor is within the range of 90° to 135° or 135° to 180°, and thereby the driving performance of the motor 77 is improved.

FIG. 16 shows the control mode of the angle grinder shown in FIG. 12 from the perspective of the curve between the rotational speed of the motor and the motor torque. The horizontal axis represents the output torque of the motor in units of N.m, and the vertical axis represents the rotational speed of the motor in units of rpm. The solid line is the curve when the control mode of this example is adopted, and the thick dashed line is the curve when the square wave control mode in the related art is adopted.

As shown in FIG. 16, as the load of the motor increases, the output torque of the motor should also increase accordingly. In this example, the first load interval corresponds to the torque interval section from 0 to Tn1, and the second load interval corresponds to the torque interval section greater than Tn1.

In the first load interval, the driver circuit 74 is controlled in the first characteristic control mode so as to make the motor 77 rotate within the range of a first preset rotational speed. In the first characteristic control mode, the motor 77 can still be controlled to reach a higher rotational speed after the voltage applied to the motor 77 reaches a maximum power supply voltage of the power supply device 71. In the first load interval, in response to the controller 73 controlling the driver circuit 74 in the first characteristic control mode, the motor 77 outputs the first rotational speed. In the second load interval, in response to the controller 73 controlling the driver circuit 74 in the second characteristic control mode, the motor 77 outputs the second rotational speed. In response to the controller 73 controlling the driver circuit 74 in the third control mode, the motor 77 outputs the third rotational speed. The first rotational speed is greater than the third rotational speed and the second rotational speed is greater than the third rotational speed. In this manner, for comparison between the control mode in this example and the square wave control mode in the related art, the rotational speed of the motor in the control mode in this example is higher than the rotational speed of the motor in the square wave control mode in the related art under the same output torque of the motor regardless of light-heavy load or medium-heavy load. Optionally, the third control mode is the square wave control mode in the related art.

In combination with FIGS. 16 and 17, in the first load interval (that is, a torque interval section from 0 to Tm3), the driver circuit 74 is controlled in the first characteristic control mode so as to make the rotational speed of the motor 77 be less than the preset threshold. The preset threshold is set according to the characteristics of the motor and the current of the motor. In this example, a magnitude of the preset threshold is KtIs. Kt=1.5Pn$\Psi f$, Pn is the number of pole pairs of magnets, for example, four magnets have two pole pairs, and $\Psi f$ is the flux linkage constant of the motor. Is is the current of the motor. In the second torque interval (that is, in the interval section of torques greater than Tm3), the driver circuit 74 is controlled in the second characteristic control mode so as to make the torque of the motor 77 continue to be greater than the preset threshold KtIs at least within the preset time range. The preset threshold KtIs is set according to a characteristic kt of the motor and the current Is of the motor. A load torque of the motor in the first load interval is less than the load torque of the motor in the second load interval.

Of course, in this example, the controller 73 in FIG. 14 may be adopted to adjust the included angle between the stator flux linkage and the rotor flux linkage by directly controlling the stator flux linkage. Moreover, the controller 43 in FIG. 4 may also be adopted to indirectly control the stator flux linkage by controlling the current or voltage vector so as to adjust the included angle between the stator flux linkage and the rotor flux linkage. Such manner can also achieve that the rotational speed of the motor of this example is higher than the rotational speed in the square wave control mode in the related art under the same output torque of the motor regardless of light-heavy load or medium-heavy load. In some examples, the controller 73 includes the first current distribution unit 432, the first current conversion unit 437, the first current loop 433, the second current loop 434, the first voltage conversion unit 435 and the first control signal generation unit 436. The first current distribution unit 432 is configured to distribute the direct-axis target current and the quadrature-axis target current according to the target current of the motor 47 generated by the first rotational speed loop 431. The first current conversion unit 437 is configured to generate the direct-axis actual current and the quadrature-axis actual current according to the actual current of the motor 47 and the position of the rotor of the motor. The first current loop 433 is configured to generate the first voltage regulation amount Ud according to the direct-axis target current and the direct-axis actual current. The second current loop 434 is configured to generate the second voltage regulation amount Uq according to the quadrature-axis target current and the quadrature-axis actual current. The first voltage conversion unit 435 is configured to generate the first voltage control amount Ua and the second voltage control amount Ub according to the first voltage regulation amount Ud and the second voltage regulation amount Uq. The first control signal generation unit 436 generates the control signal according to the first voltage control amount Ua and the second voltage control amount Ub, and the control signal is used for controlling the driver circuit 44. The control signal is the PWM signal. The duty cycle of the PWM signal varies with the position of the rotor. The controller 43 controls the driver circuit 44 so as to make the input voltage of the motor 47 change approximately in the sine wave. The motor 47 is a three-phase motor, and the three-phase input voltages of the motor 47 are at the phase angle of 120° to each other.

Figure 18:
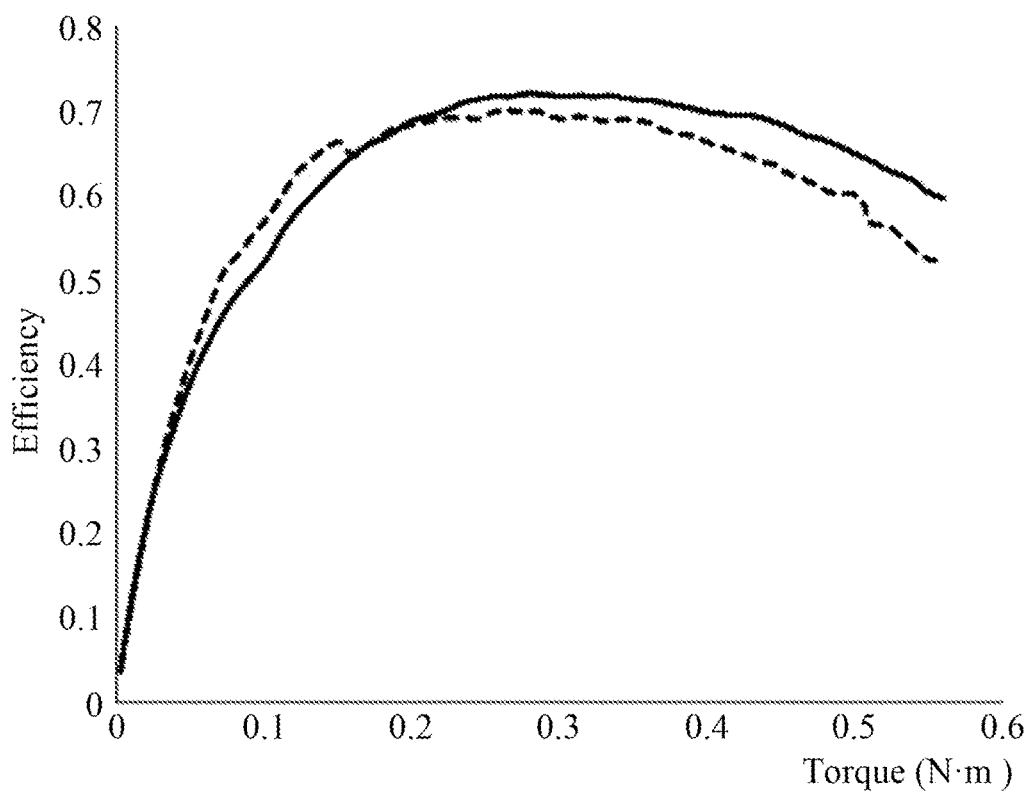
FIG. 18 is a graph of a motor efficiency versus a motor torque of an angle grinder.

The effect of the control mode of this example is compared with the effect of the square wave control mode in the related art from the perspective of the relation curve between the motor efficiency and the motor torque in FIG. 18. The horizontal axis represents the output torque of the motor in units of N.m and the vertical axis represents the motor efficiency in no unit. The solid line is the effect curve showing the variation of the motor efficiency with the motor torque in the control mode of this example, and the thick dashed line indicates the effect curve showing the variation of the motor efficiency with the motor torque in the square wave control mode in the related art. As can be seen from the figure, the motor has a higher efficiency in the control mode of this example than in the square wave control mode in the related art in the light- and medium-load ranges.

Figure 19:
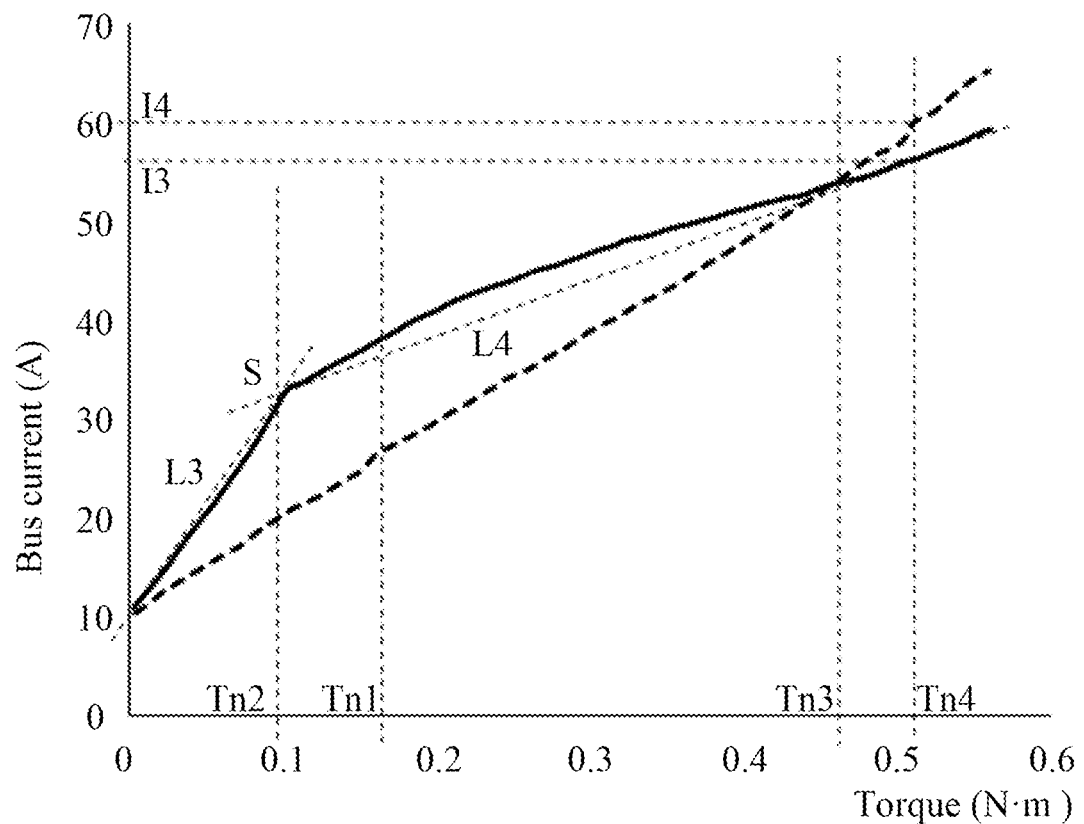
FIG. 19 is a graph of a bus current of a motor versus a motor torque of an angle grinder.

Referring to FIG. 19, the effect of the control mode of this example is compared with the effect of the square wave control mode in the related art from the perspective of the relation curve between the bus current of the motor and the motor torque. The horizontal axis represents the output torque of the motor in units of N.m and the vertical axis represents the bus current of the motor in units of A. The solid line is the effect curve showing the variation of the motor efficiency with the motor torque in the control mode of this example, and the thick dashed line indicates the effect curve showing the variation of the motor efficiency with the motor torque in the square wave control mode in the related art.

In this example, the bus current of the motor 77 increases at the first slope in the first torque interval (for example, 0 to Tn2) and the bus current of the motor 77 increases at the second slope in the second torque interval (for example, Tn2 to Tn4). The first slope is greater than the second slope. Regardless of a torque interval in the first load interval or a torque interval in the second load interval, or a torque interval spanning the first load interval and the second load interval, in short, in this example, the bus current of the motor 77 has an inflection point S, and the first slope before the inflection point is greater than the second slope after the inflection point S. That is, before the inflection point R, the bus current of the motor increases at a relatively high speed with the motor torque, and after the inflection point, the bus current of the motor increases at a relatively low speed with the motor torque. Optionally, the first slope may be the slope of the virtual line connecting the two end points 0 and Tn2 of the first torque interval corresponding to the rotational speed. The second slope is the slope of a virtual line L3 connecting the two end points of the second torque interval, and the second slope is the slope of a virtual straight line L4 connecting the two end points Tn2 and Tn4 of the second torque interval corresponding to the rotational speed. Optionally, the first slope is the slope at any point on a curve showing the variation of the bus current of the motor with the torque in the first torque interval, and the second slope is the slope at any point on the curve showing the variation of the bus current of the motor with the torque in the second torque interval.

In this example, in response to the controller 73 controlling the driver circuit 74 in the second characteristic control mode to make the motor 77 rotate at the preset torque, the output current of the power supply device 71 is the second output current. In response to the controller 74 controlling the driver circuit 74 in the third control mode to make the motor 77 rotate at the preset torque, the output current of the power supply device 71 is a third output current. The second output current is less than the third output current. Optionally, the third control mode is the square wave control mode in the related art.

Referring to FIG. 19, at the preset torque Tn4, the bus current of the motor in the second characteristic control mode of this example is I3, and the bus current under the square wave control in the related art is I4. I3<I4. Therefore, the current output by the power supply device 71 is less in the case of medium-heavy load in the second control mode among the control modes of this example than in the square wave control mode in the related art.

Figure 20:
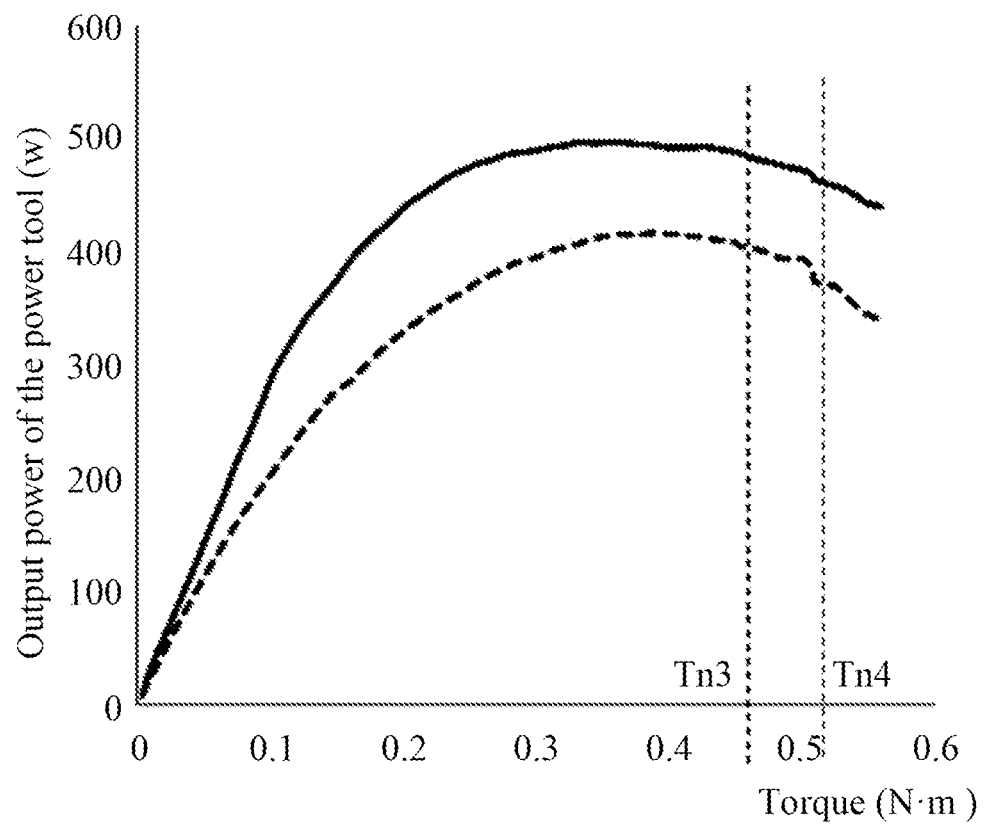
FIG. 20 is a graph of an output power versus a motor torque of an angle grinder.

Referring to FIG. 20, in this example, in response to the controller 73 controlling the driver circuit 74 in the first characteristic control mode, the output power of the power tool 60 is the first output power. In response to the controller 73 controlling the driver circuit 74 in the second characteristic control mode, the output power of the power tool 60 is the second output power. In response to the controller 73 controlling the driver circuit 74 in the third control mode, the output power of the power tool 60 is third output power. The first output power is greater than the third output power, and the second output power is greater than the third output power. Optionally, the third control mode is the square wave control mode in the related art, that is, in this example, the output power of the power tool 60 is higher than the output power of the power tool 60 under the square wave control in the related art, regardless of in the first characteristic control mode or in the second characteristic control mode.

The effect of the control mode of this example is compared with the effect of the square wave control mode in the related art from the perspective of the curve showing the variation of the output power of the power tool with the motor torque in FIG. 20. The horizontal axis represents the motor torque in units of N.m and the vertical axis represents the output power of the power tool in units of W. As can be seen from FIG. 20, when the output torque of the motor is the same, the output power of the power tool 60 is higher in the control mode of this example than in the square wave control mode in the related art.

In combination with FIGS. 19 and 20, in the control mode of the present application, when the motor rotates at the preset torque (for example, Tn4) in the preset torque interval (greater than Tn3), the bus current of the motor is less, the output current of the power supply device 71 is less, and the output power of the power tool 60 is higher. Therefore, energy can be saved. For the power tool using the battery pack as the power supply device 71, the endurance capacity of the battery pack is higher.

In combination with FIGS. 16, 19, and 20, in the control mode of the present application, when the motor rotates at the preset torque (for example, Tn4) in the preset torque interval (greater than Tn3), the bus current of the motor is less, the output current of the power supply device 71 is less, the output power of the power tool 60 is higher, and the rotational speed of the motor is higher. Therefore, energy can be saved. For the power tool using the battery pack as the power supply device 71, the endurance capacity of the battery pack is higher.

In the above-mentioned examples of the present application, the Te=f($\Psi$s, $\Psi$f, $\beta$) functional relationship is established and the included angle between the stator flux linkage $\Psi$s and the rotor flux linkage $\Psi$f is dynamically adjusted to obtain the characteristic curves of FIG. 8 to FIG. 11 implemented on the power tool or the characteristic curves of FIG. 16 to FIG. 20 implemented on the power tool so as to make the output performance of the power tool of the present application better.

In some other examples of the present application, according to at least one of the current of the motor, the rotational speed of the motor, or the position of the rotor, the controller adopted outputs the PWM signal that changes with the position of the rotor to control the driver circuit, so that the input voltage of the motor changes approximately in the sine wave or the saddle wave. The amplitude or phase of at least one of the input voltage or current is adjusted to adjust the included angle between the stator flux linkage and the rotor flux linkage, so that the motor has continuous and alternating current state on the three-phase stator windings in at least one electrical cycle or part of the electrical cycle. The three-phase input voltages of the motor are at a phase angle of 120° to each other. The current states on the three-phase stator windings can synthesize vector torques. These vector torques move approximately continuously along a circumference, and the rotor of the motor rotates synchronously with the torques that move approximately continuously along the circumference. Compared with merely six discrete and discontinuous driving states in the square wave control mode in the related art, the present application can improve a drive efficiency of the motor. Through the above control modes, the power tool of the present application can obtain the better output performance of FIGS. 8 to 11 or FIGS. 16 to 20.

What is claimed is:

1. A power tool, comprising:
a motor comprising a stator and a rotor, wherein the motor is configured to generate a reluctance torque;
a power supply device configured to supply electrical energy to the motor;
a driver circuit electrically connected to the motor to drive the motor; and
a controller configured to control the driver circuit, wherein the controller is configured to:
according to at least one of a current of the motor, a rotational speed of the motor, or a position of the rotor, dynamically adjust a current applied to the stator so that an included angle between a stator flux linkage of the motor and a rotor flux linkage of the motor ranges from 90° to 135°.

2. The power tool according to claim 1, wherein an output torque of the motor is greater than a preset threshold within a preset time range and the preset threshold is set according to a characteristic of the motor and the current of the motor.

3. The power tool according to claim 1, wherein a bus current of the motor increases at a first slope in a first torque interval, the bus current of the motor increases at a second slope in a second torque interval, and the first slope is greater than the second slope.

4. The power tool according to claim 1, wherein the controller is configured to output a pulse-width modulation (PWM) signal to the driver circuit and a duty cycle of the PWM signal varies with the position of the rotor.

5. The power tool according to claim 1, wherein the controller controls the driver circuit to make an input voltage of the motor change in a sine wave.

6. The power tool according to claim 5, wherein the motor is a three-phase motor and three-phase input voltages of the motor are at a phase angle of 120° to each other.

7. The power tool according to claim 1, wherein the controller comprises a first rotational speed loop and the first rotational speed loop is configured to generate a target current of the motor according to a target rotational speed of the motor and an actual rotational speed of the motor.

8. The power tool according to claim 7, wherein the controller further comprises a first current distribution unit configured to distribute a direct-axis target current and a quadrature-axis target current according to the target current of the motor generated by the first rotational speed loop, a first current conversion unit configured to generate a direct-axis actual current and a quadrature-axis actual current according to an actual current of the motor and the position of the rotor of the motor, a first current loop configured to generate a first voltage regulation amount according to the direct-axis target current and the direct-axis actual current, a second current loop configured to generate a second voltage regulation amount according to the quadrature-axis target current and the quadrature-axis actual current, a first voltage conversion unit configured to generate a first voltage control amount and a second voltage control amount according to the first voltage regulation amount and the second voltage regulation amount; and a first control signal generation unit configured to generate a control signal according to the first voltage control amount and the second voltage control amount, wherein the control signal is configured for controlling the driver circuit.

9. The power tool according to claim 1, wherein the controller comprises a second rotational speed loop configured to generate a target torque of the motor according to a target rotational speed and an actual rotational speed of the motor.

10. The power tool according to claim 9, wherein the controller further comprises a torque loop configured to generate a third voltage regulation amount according to a target torque and an actual torque of the motor, a flux linkage loop configured to generate a fourth voltage regulation amount according to a target stator flux linkage and an actual stator flux linkage of the motor, a second voltage conversion unit configured to generate a third voltage control amount and a fourth voltage control amount according to the third voltage regulation amount and the fourth voltage regulation amount; and a second control signal generation unit configured to generate a control signal according to the third voltage control amount and the fourth voltage control amount, wherein the control signal is configured for controlling the driver circuit.

11. The power tool according to claim 1, further comprising a speed regulation mechanism configured to set the target rotational speed of the motor.

12. A power tool, comprising:
a motor, comprising a stator and a rotor, wherein the motor is a motor capable of generating a reluctance torque;
a power supply device configured to supply electrical energy to the motor;
a driver circuit electrically connected to the motor to drive the motor; and
a controller configured to control the driver circuit, wherein the controller is configured to:
in a first load interval, control the driver circuit in a first characteristic control mode so as to make the motor rotate within a range of a first rotational speed; and
in a second load interval, control the driver circuit in a second characteristic control mode so as to make the motor rotate within a range of a second rotational speed;
wherein the first characteristic control mode comprises: according to at least one of a current of the motor, a rotational speed of the motor, or a position of the rotor of the motor, dynamically adjusting a current applied to the stator so that an included angle between a stator flux linkage and a rotor flux linkage ranges from 135° to 180°; and
the second characteristic control mode comprises: according to the at least one of the current of the motor, the rotational speed of the motor, or the position of the rotor of the motor, dynamically adjusting the current applied to the stator so that the included angle between the stator flux linkage and the rotor flux linkage ranges from 90° to 135°.

13. The power tool according to claim 12, wherein in the second characteristic control mode, an output torque of the motor is greater than a preset threshold within a preset time range and the preset threshold is set according to a characteristic of the motor and the current of the motor.

14. The power tool according to claim 12, wherein a load torque of the motor in the first load interval is less than a load torque of the motor in the second load interval.

15. The power tool according to claim 12, wherein a bus current of the motor increases at a first slope in a first torque interval and the bus current of the motor increases at a second slope in a second torque interval, wherein the first slope is greater than the second slope.

16. The power tool according to claim 12, wherein the controller comprises a first rotational speed loop and the first rotational speed loop is configured to generate a target current of the motor according to a target rotational speed of the motor and an actual rotational speed of the motor.

17. The power tool according to claim 16, wherein the controller further comprises a first current distribution unit configured to distribute a direct-axis target current and a quadrature-axis target current according to the target current of the motor generated by the first rotational speed loop, a first current conversion unit configured to generate a direct-axis actual current and a quadrature-axis actual current according to an actual current of the motor and the position of the rotor of the motor, a first current loop configured to generate a first voltage regulation amount according to the direct-axis target current and the direct-axis actual current, a second current loop configured to generate a second voltage regulation amount according to the quadrature-axis target current and the quadrature-axis actual current, a first voltage conversion unit configured to generate a first voltage control amount and a second voltage control amount according to the first voltage regulation amount and the second voltage regulation amount, and a first control signal generation unit configured to generate a control signal according to the first voltage control amount and the second voltage control amount, wherein the control signal is configured for controlling the driver circuit.

18. The power tool according to claim 12, wherein the controller comprises a second rotational speed loop configured to generate a target torque of the motor according to a target rotational speed and an actual rotational speed of the motor.

19. The power tool according to claim 18, wherein the controller further comprises a torque loop configured to generate a third voltage regulation amount according to a target torque and an actual torque of the motor, a flux linkage loop configured to generate a fourth voltage regulation amount according to a target stator flux linkage and an actual stator flux linkage of the motor, a second voltage conversion unit configured to generate a third voltage control amount and a fourth voltage control amount according to the third voltage regulation amount and the fourth voltage regulation amount, and a second control signal generation unit configured to generate a control signal according to the third voltage control amount and the fourth voltage control amount, wherein the control signal is configured for controlling the driver circuit.

20. The power tool according to claim 12, further comprising a speed regulation mechanism configured to set the target rotational speed of the motor.

* * * * *